Figure 4:
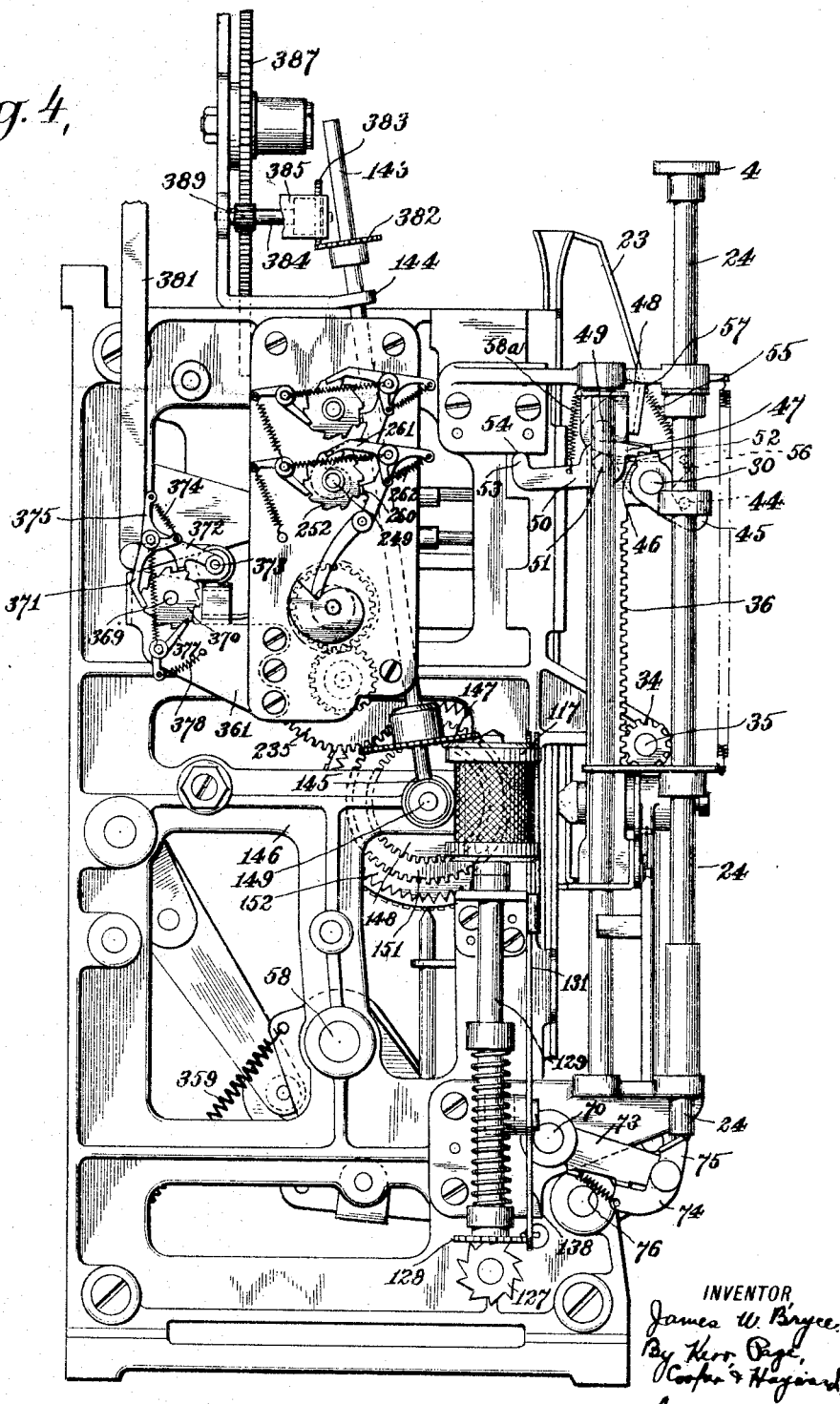

J. W. BRYCE.
TIME RECORDER.
APPLICATION FILED JULY 31, 1915.
1,206,089.
Patented Nov. 28, 1916.
18 SHEETS—SHEET 1.
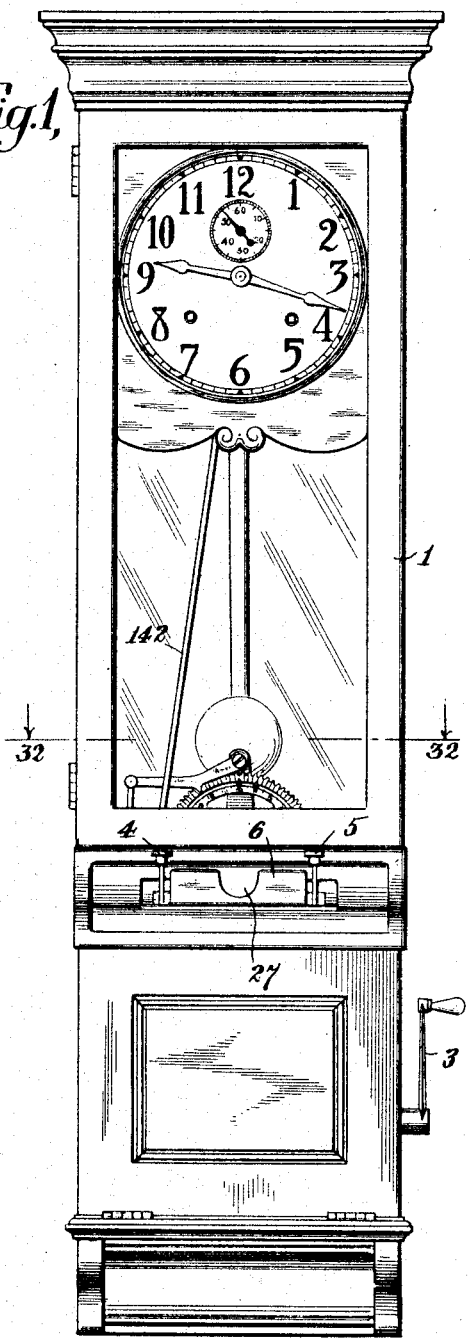
Fig.1,
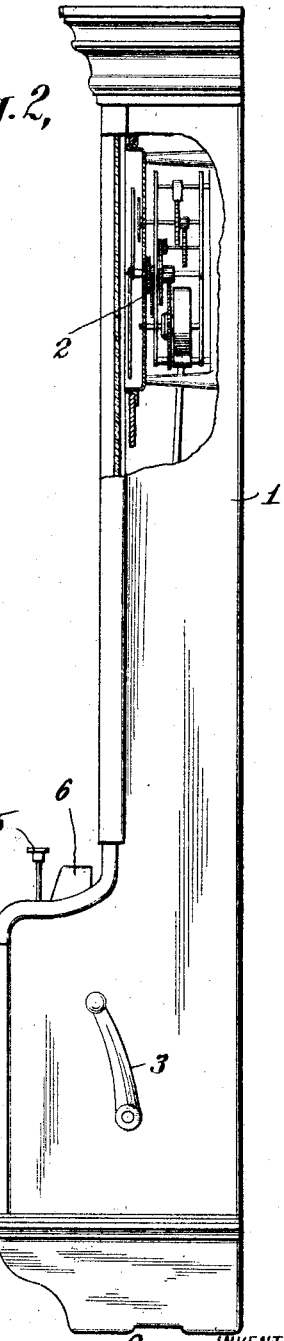
Fig.2,
James W. Bryce, INVENTOR.
BY
Kerr, Page, Cooper & Hayward
his ATTORNEYS.

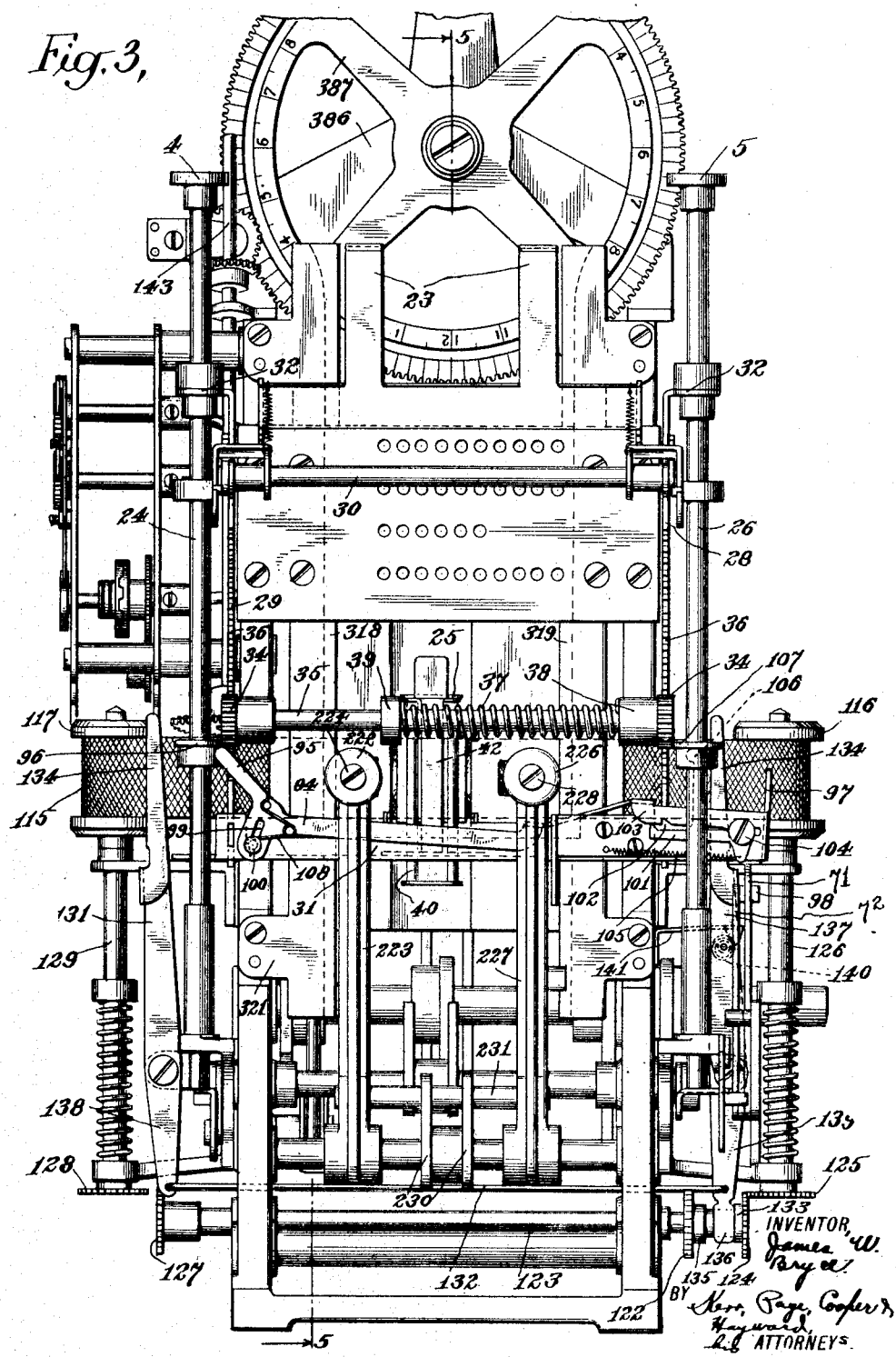

J. W. BRYCE.
TIME RECORDER.
APPLICATION FILED JULY 31, 1915.

1,206,089.

Patented Nov. 28, 1916.
18 SHEETS—SHEET 3.

J. W. BRYCE.
TIME RECORDER.
APPLICATION FILED JULY 31, 1915.

1,206,089.

Patented Nov. 28, 1916.
18 SHEETS—SHEET 4.

J. W. BRYCE.
TIME RECORDER.
APPLICATION FILED JULY 31, 1915.

1,206,089.

Patented Nov. 28, 1916.
18 SHEETS—SHEET 7.

INVENTOR
James W. Bryce
BY Kerr, Page, Cooper
& Hayward
his ATTORNEYS

J. W. BRYCE.
TIME RECORDER.
APPLICATION FILED JULY 31, 1915.
1,206,089.
Patented Nov. 28, 1916.
18 SHEETS—SHEET 8.
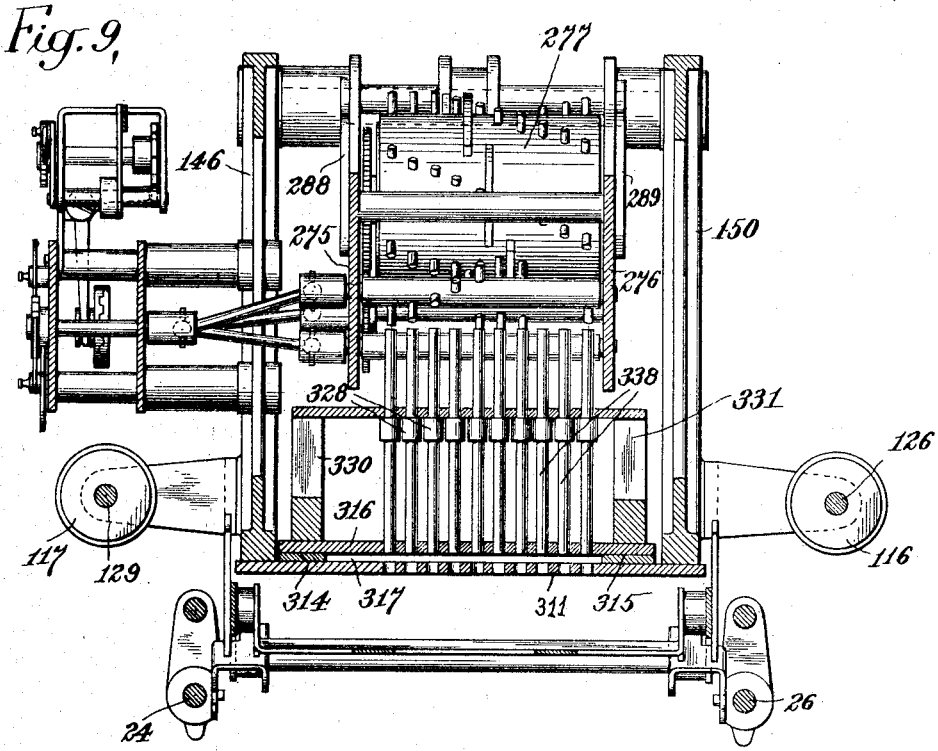
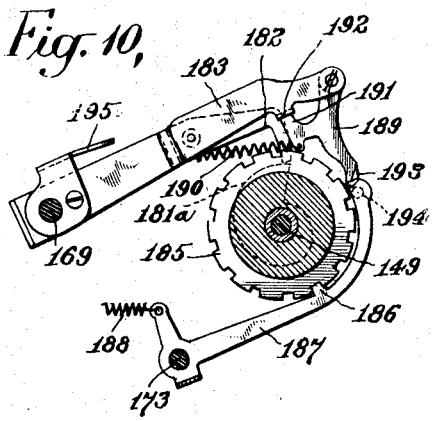
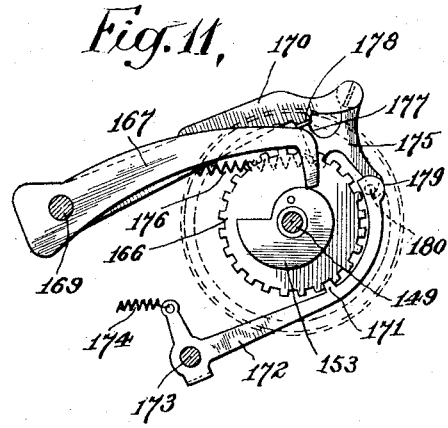
James W. Bryce, INVENTOR.
BY
Kerr, Page, Cooper & Hayward
his ATTORNEYS.

J. W. BRYCE.
TIME RECORDER.
APPLICATION FILED JULY 31, 1915.
1,206,089.
Patented Nov. 28, 1916.
18 SHEETS—SHEET 9.
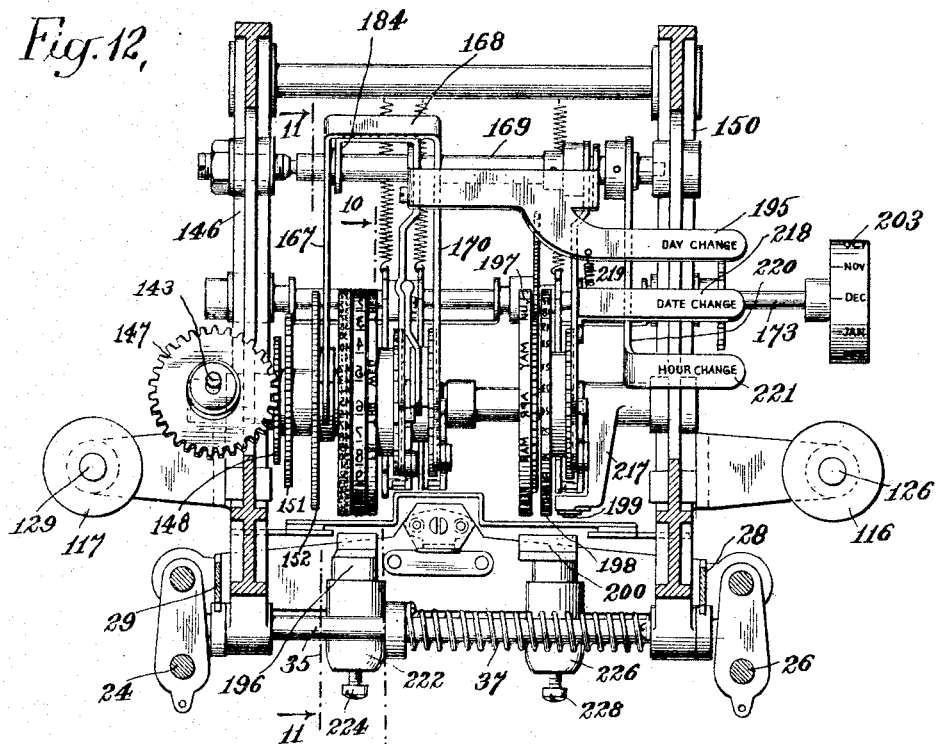
Fig. 12.
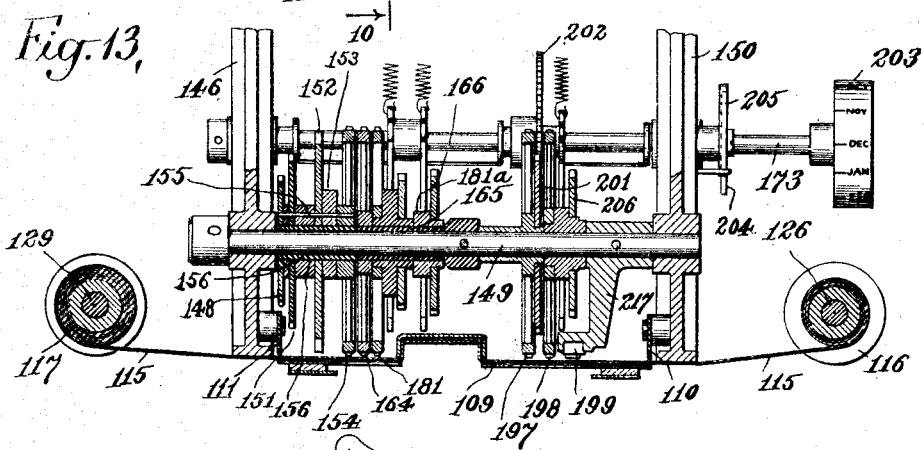
Fig. 13.
Fig. 14.
James W. Bryce,
INVENTOR.
BY Kerr, Page, Cooper
& Hayward,
his ATTORNEYS.

J. W. BRYCE.
TIME RECORDER.
APPLICATION FILED JULY 31, 1915.

1,206,089.

Patented Nov. 28, 1916.
18 SHEETS—SHEET 10.

James W. Bryce, INVENTOR.

Kerr, Page, Cooper & Hayward,
his ATTORNEYS

J. W. BRYCE.
TIME RECORDER.
APPLICATION FILED JULY 31, 1915.
1,206,089.
Patented Nov. 28, 1916.
18 SHEETS—SHEET 11.
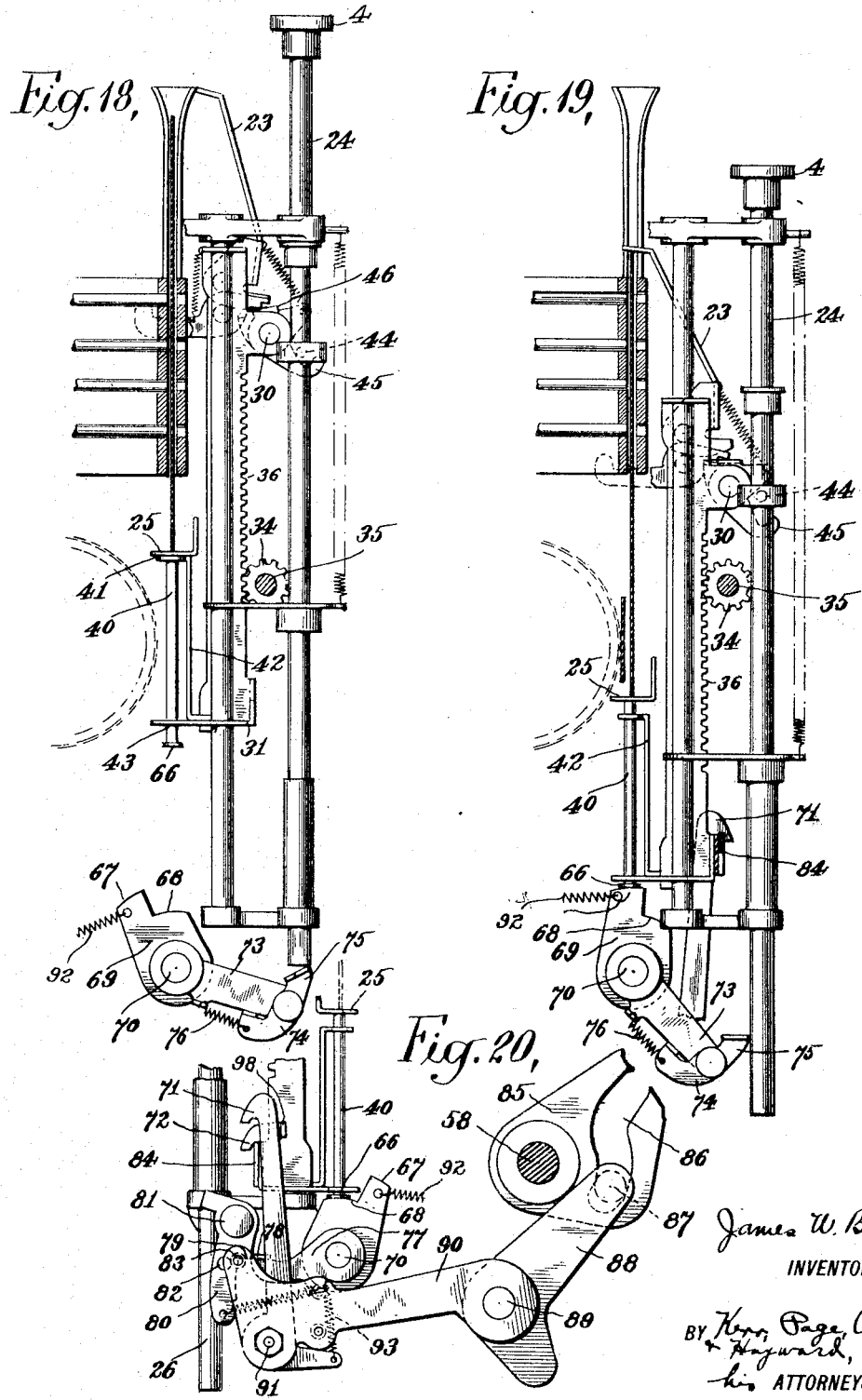

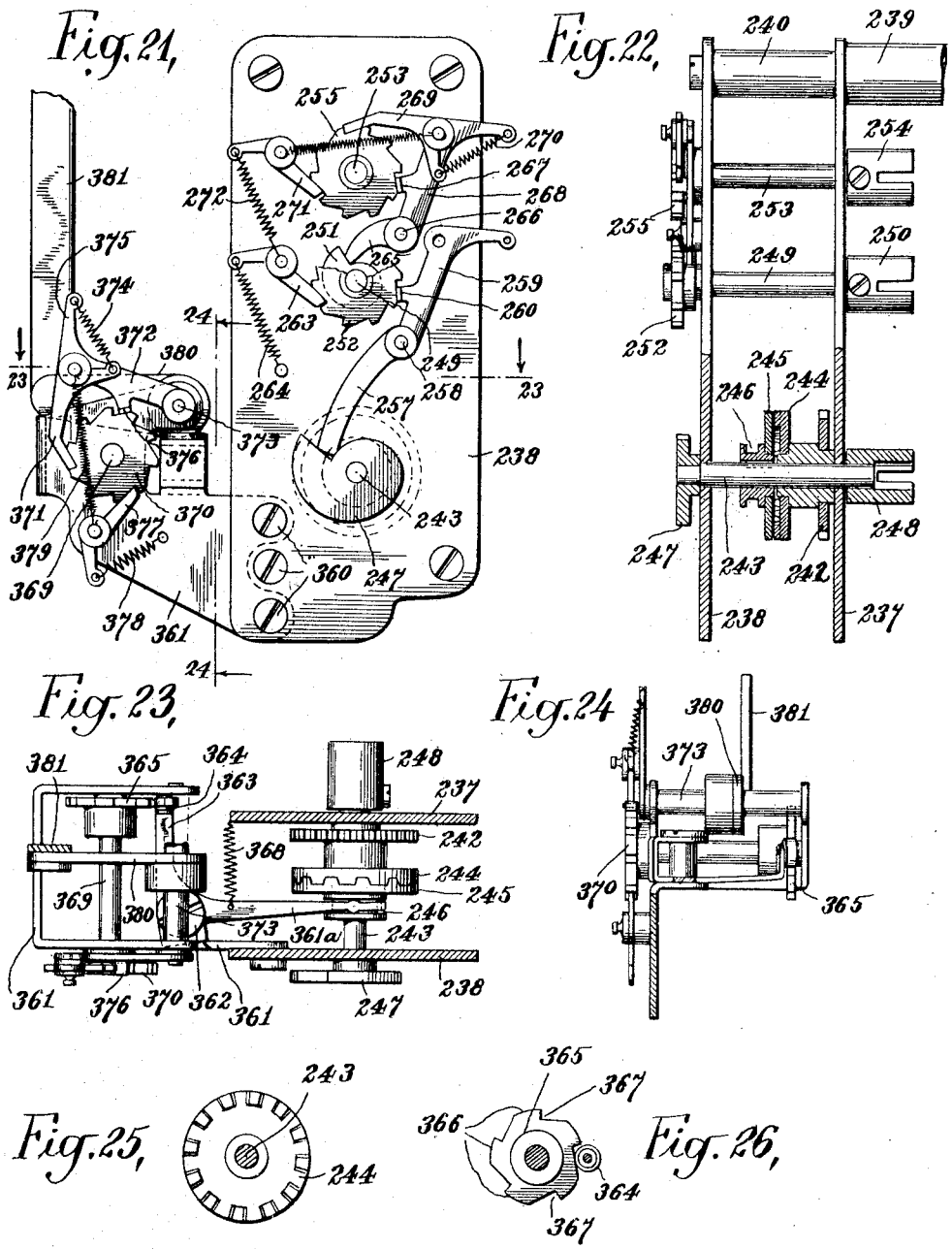

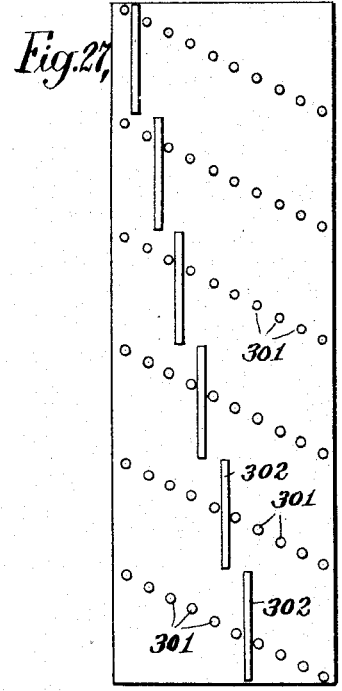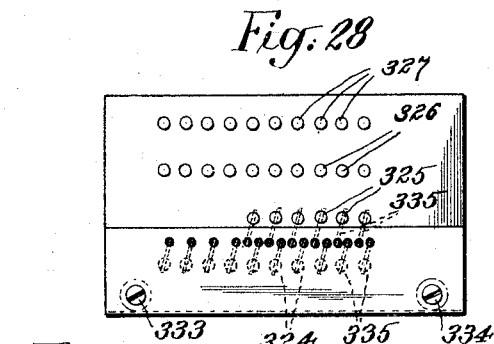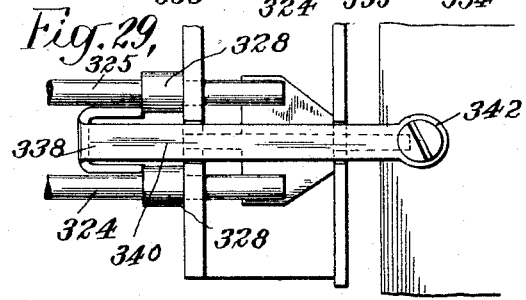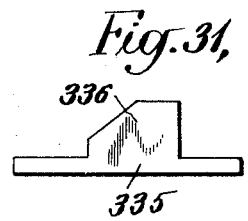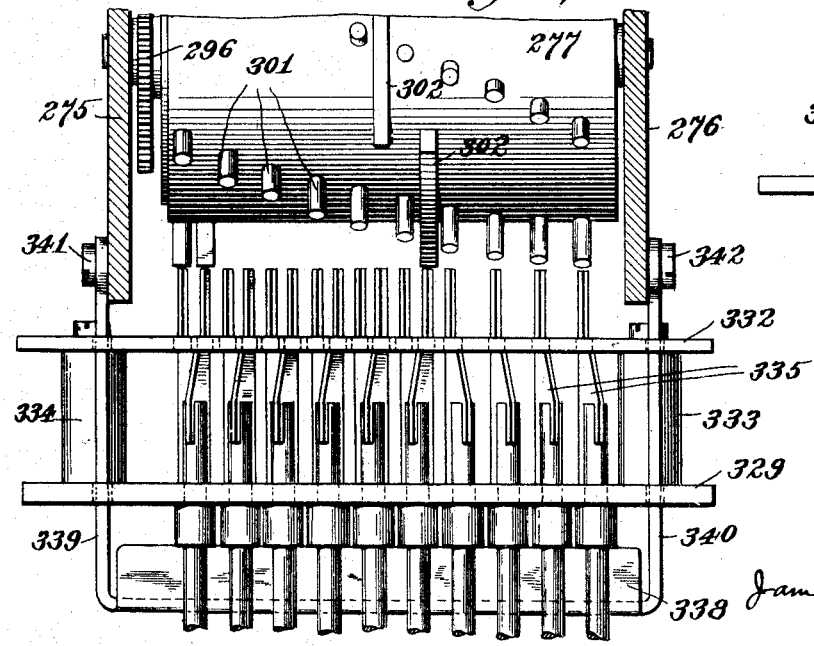

J. W. BRYCE.
TIME RECORDER.
APPLICATION FILED JULY 31, 1915.
1,206,089.
Patented Nov. 28, 1916.
18 SHEETS—SHEET 14.
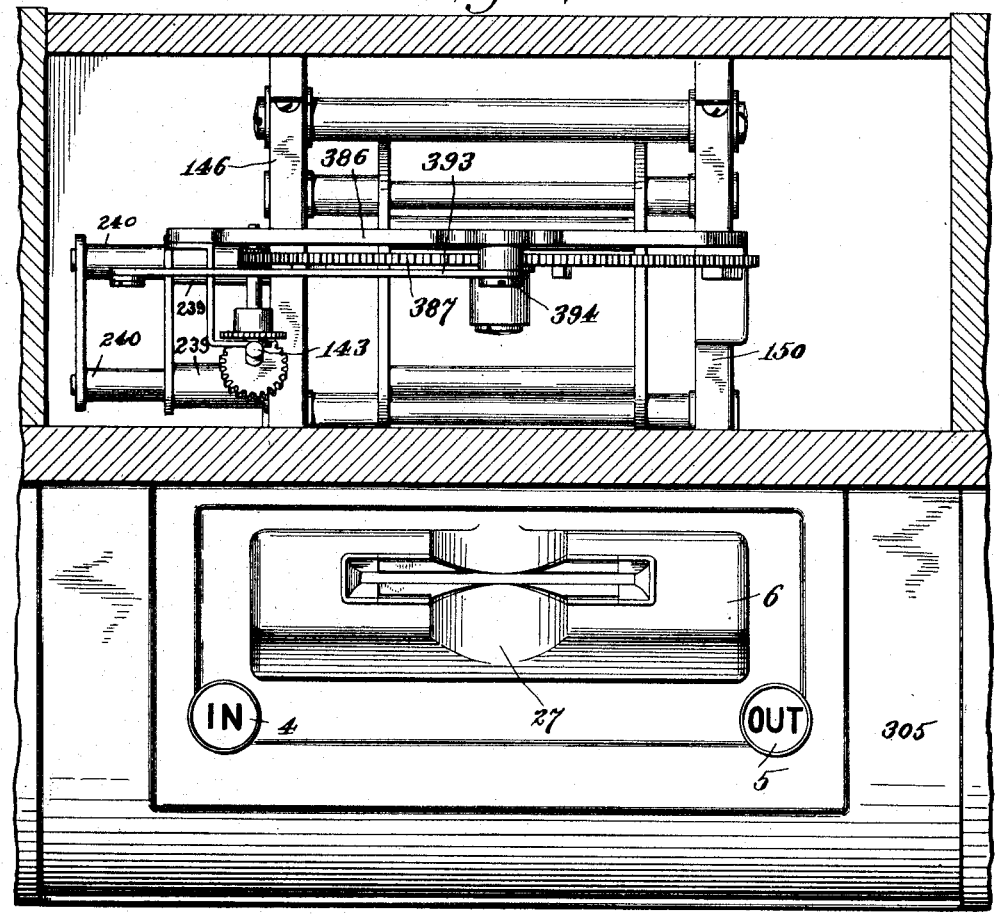
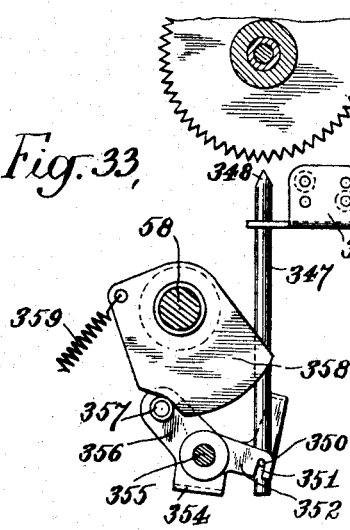
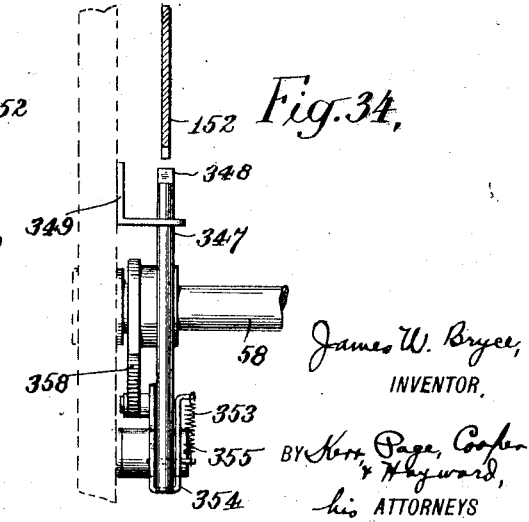

J. W. BRYCE.
TIME RECORDER.
APPLICATION FILED JULY 31, 1915.

1,206,089.

Patented Nov. 28, 1916.
18 SHEETS—SHEET 15.

THIS SIDE OUT.

No
NAME
ORDER NO
DATE
EMPLOYE NO
ARTICLE
OPERATION

James W. Bryce,
INVENTOR.

BY
his ATTORNEYS

J. W. BRYCE.
TIME RECORDER.
APPLICATION FILED JULY 31, 1915.

1,206,089.

Patented Nov. 28, 1916.
18 SHEETS—SHEET 16.

James W. Bryce, INVENTOR.

BY Kerr, Page, Cooper
& Hayward,
his ATTORNEYS

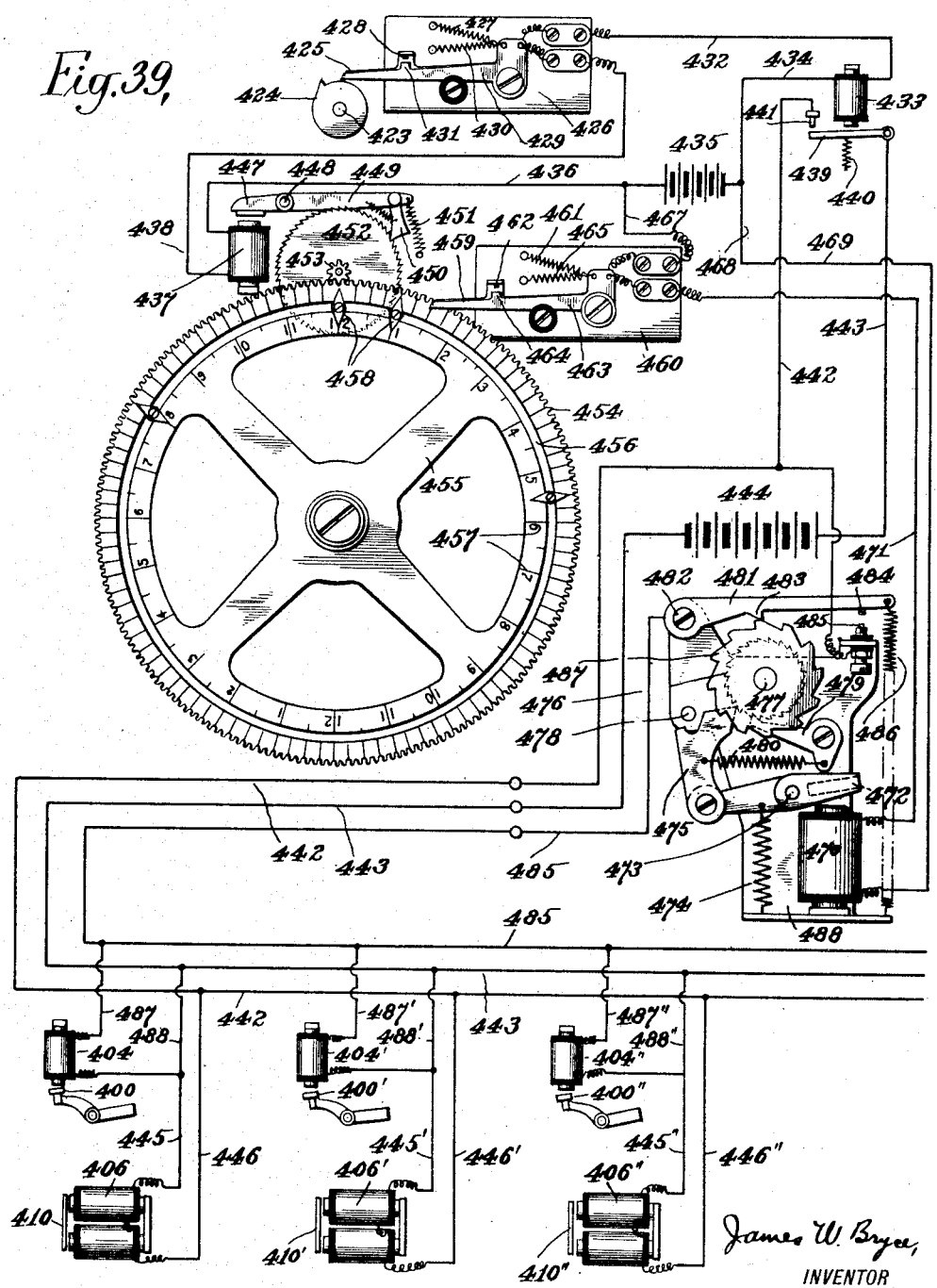

J. W. BRYCE.
TIME RECORDER.
APPLICATION FILED JULY 31, 1915.
1,206,089.
Patented Nov. 28, 1916.
18 SHEETS—SHEET 18.
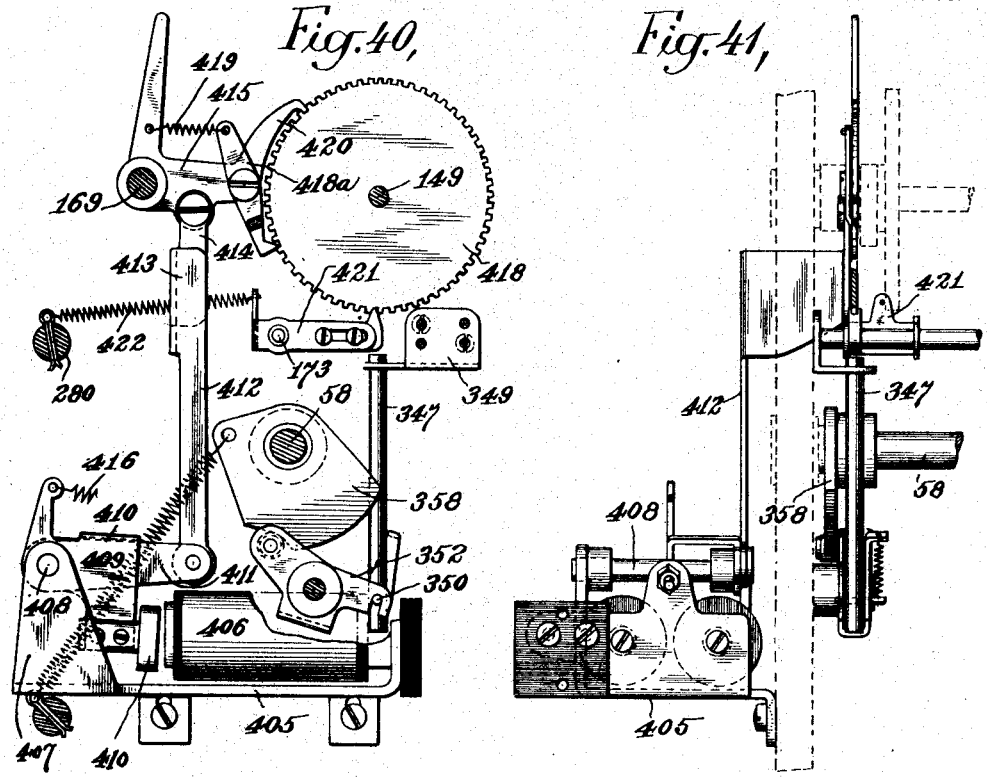
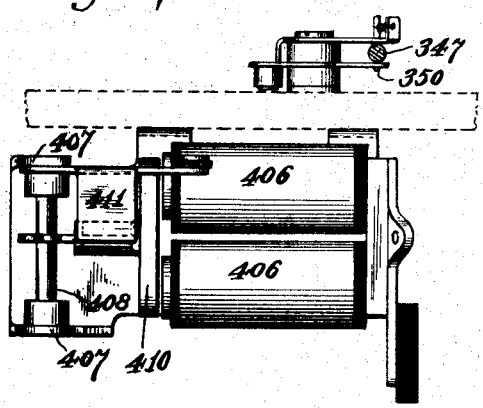
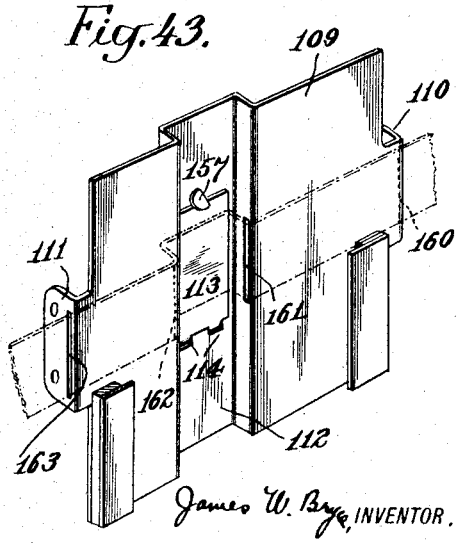
James W. Bryce, INVENTOR.
BY Kerr, Page, Cooper & Hayward,
his ATTORNEYS

UNITED STATES PATENT OFFICE.

JAMES W. BRYCE, OF BROOKLYN, NEW YORK, ASSIGNOR TO INTERNATIONAL TIME RECORDING COMPANY OF NEW YORK, OF ENDICOTT, NEW YORK, A CORPORATION OF NEW YORK.

TIME-RECORDER.

1,206,089.  Specification of Letters Patent.  Patented Nov. 28, 1916.

Application filed July 31, 1915. Serial No. 43,023.

*To all whom it may concern:*

Be it known that I, JAMES W. BRYCE, a citizen of the United States, residing at Brooklyn, in the county of Kings and State of New York, have invented certain new and useful Improvements in Time-Recorders, of which the following is a full, clear, and exact description.

The invention which forms the subject of this application for patent is an improvement in the recording mechanism, more particularly, time recording mechanism for shops, factories and the like, for use either alone for completing the records which it is capable of producing, or for use together with a suitable integrating or other like machine.

The invention which is herein set forth and claimed comprises improvements on a machine heretofore devised by me and made the subject of an application Ser. No. 825,210, filed March 17th, 1914, but as such improvements are largely in matters of detail they will be set forth in the specification and referred to in the accompanying drawings.

Figure 5:
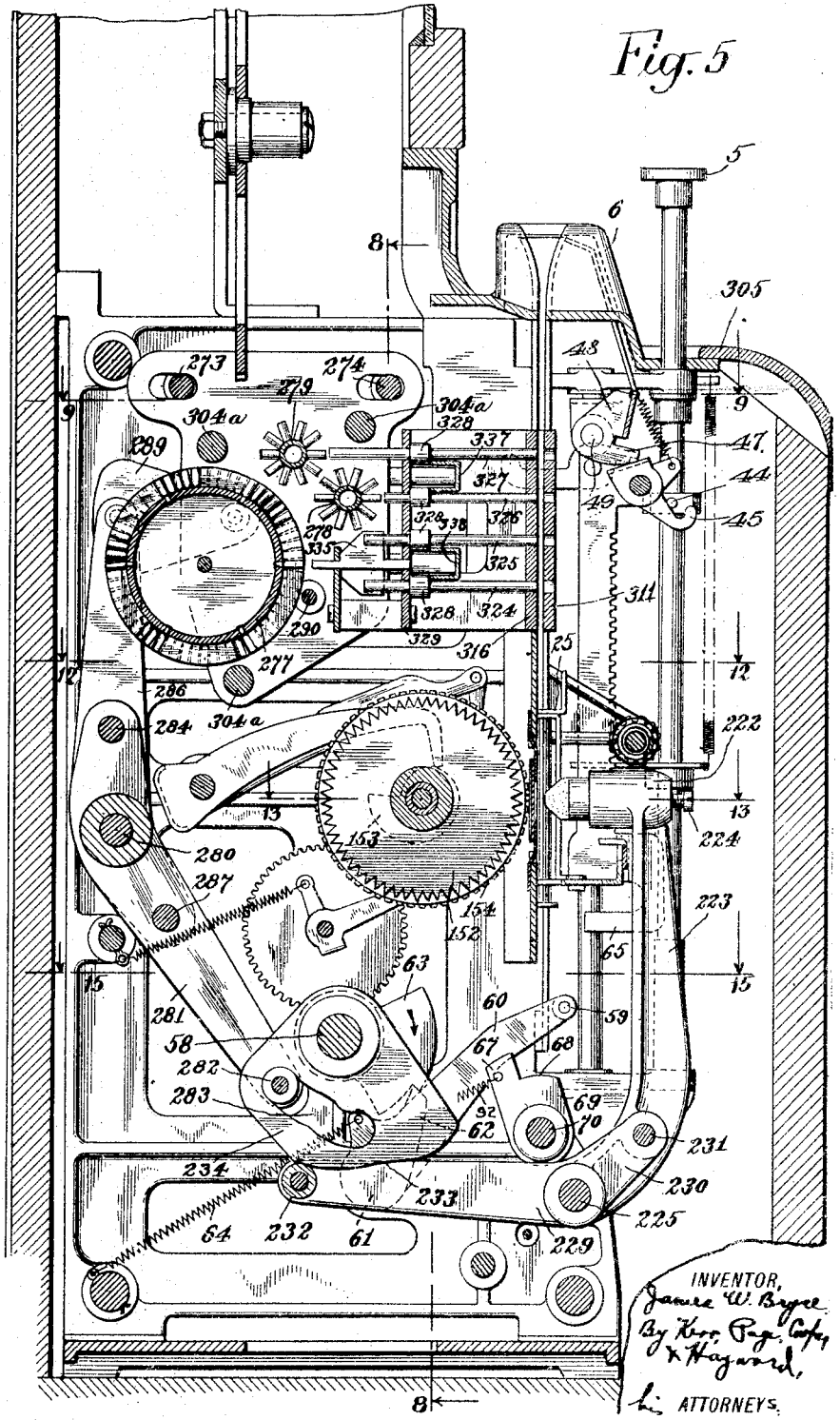
Figure 6:
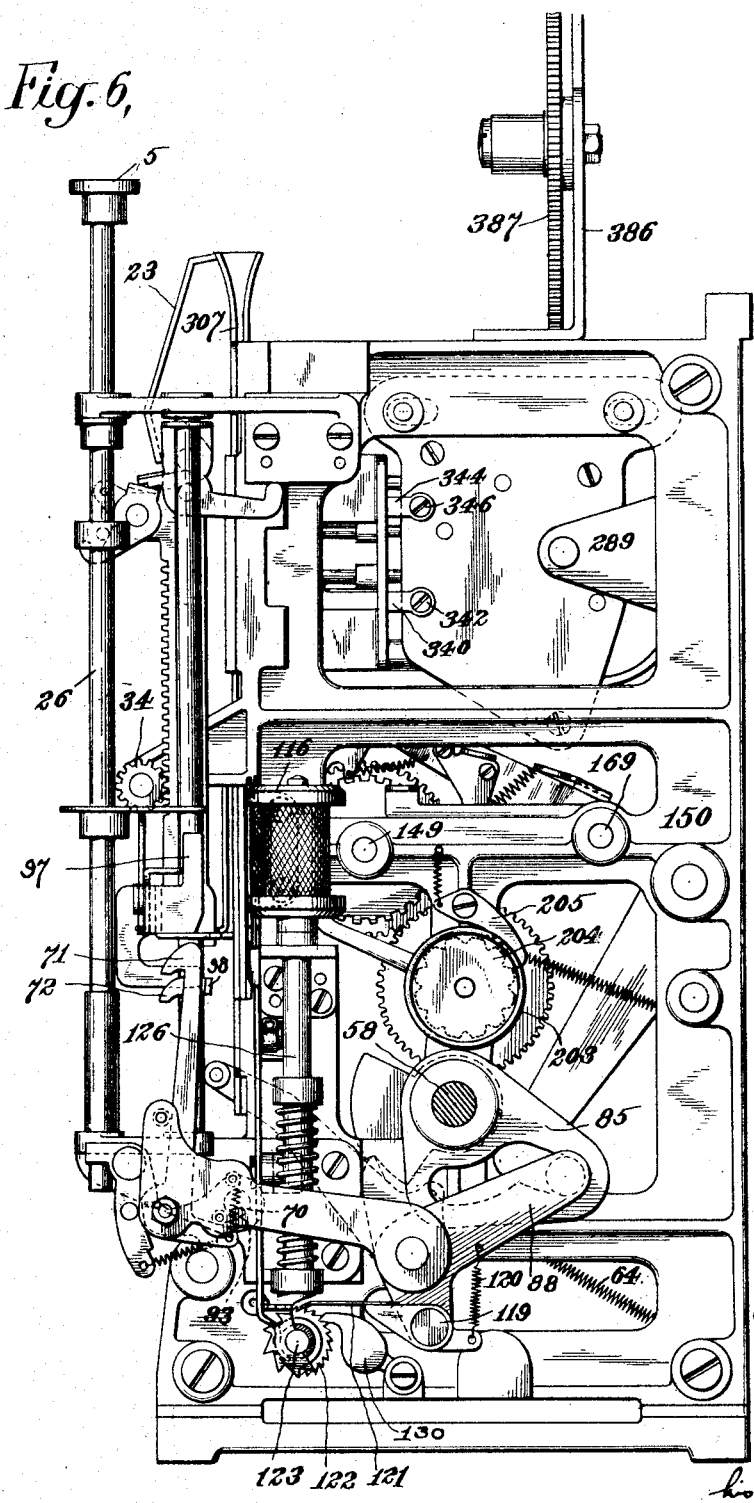
Figure 7:
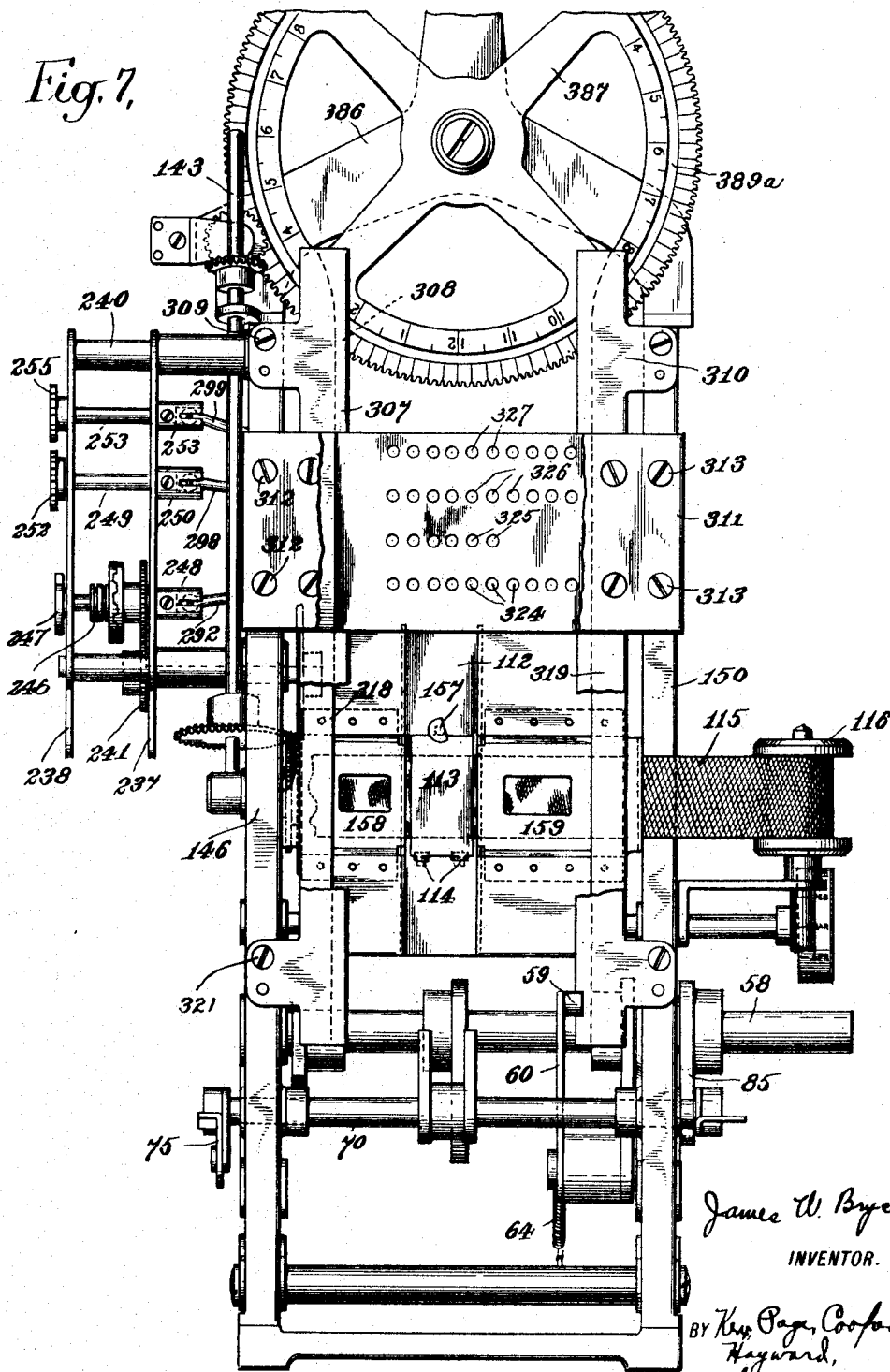
Figure 8:
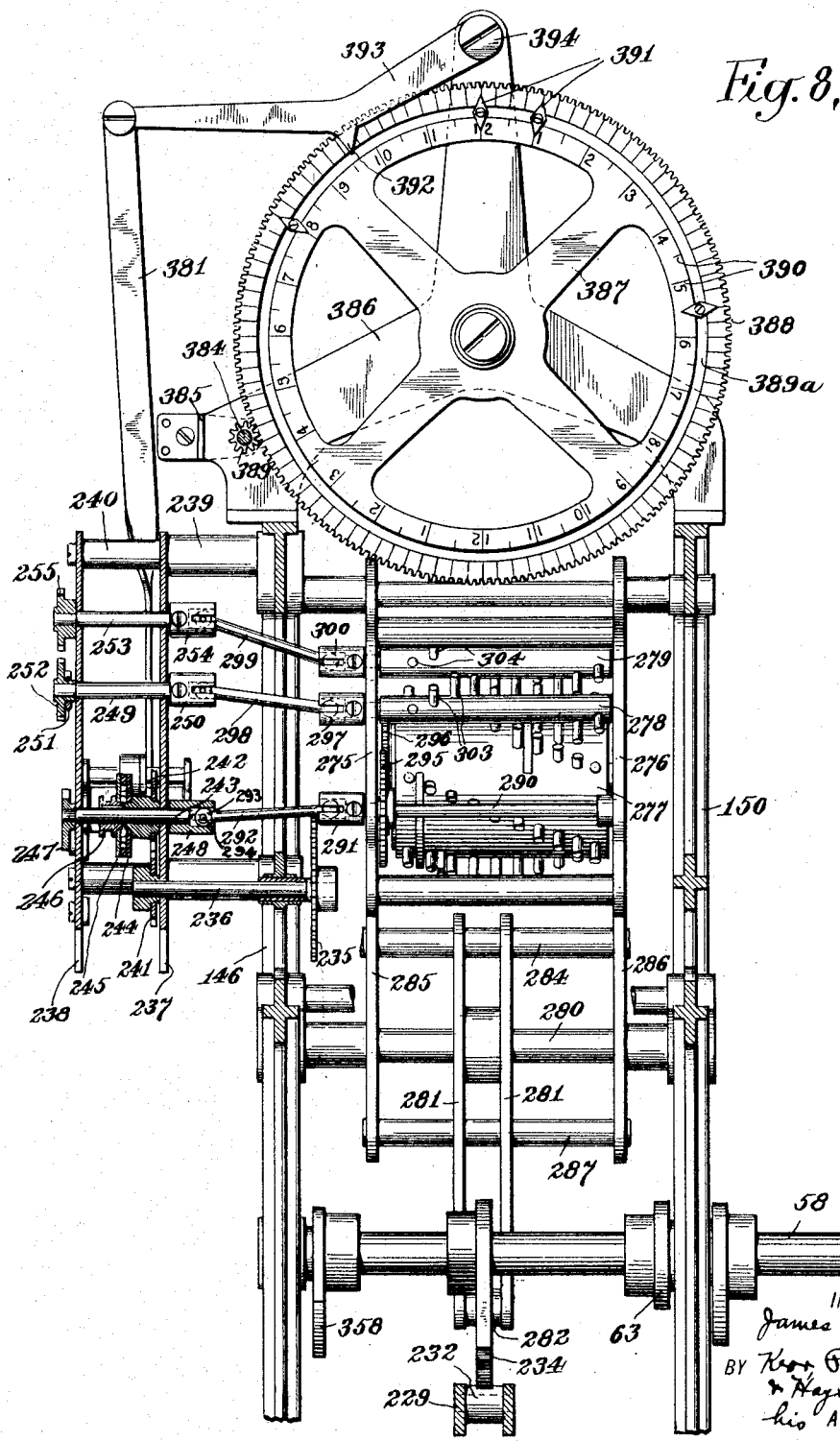
Figure 15:
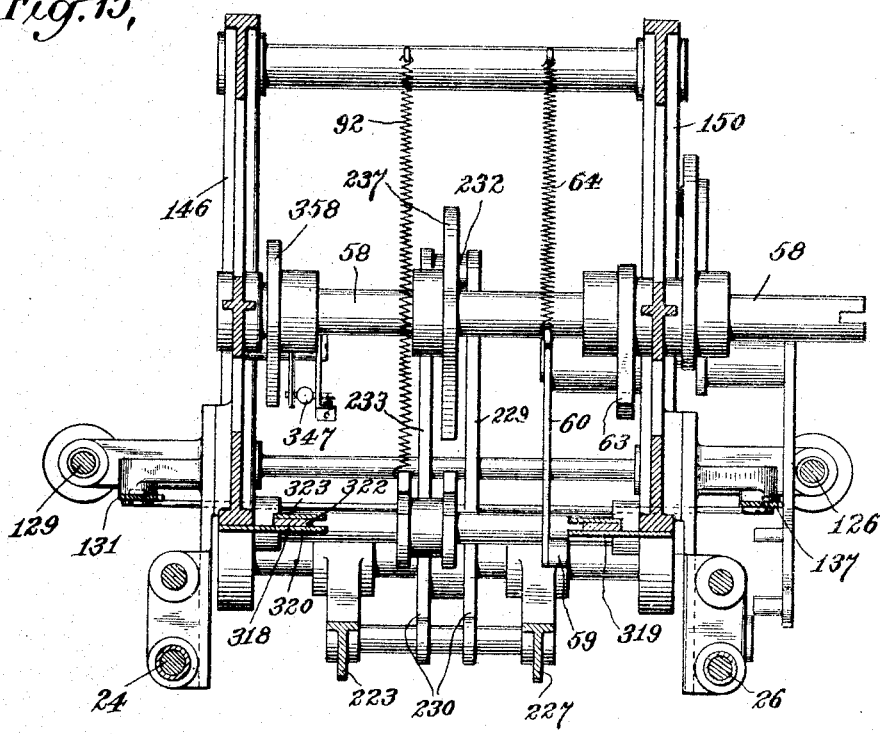
Figure 16:
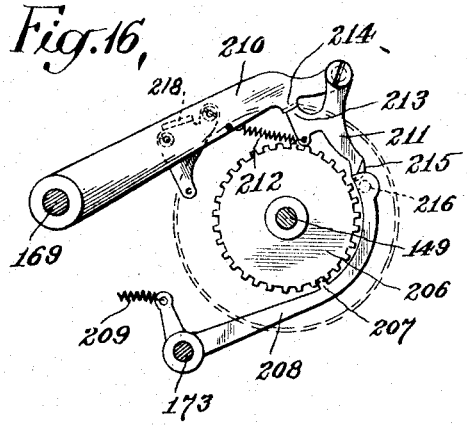
Figure 17:
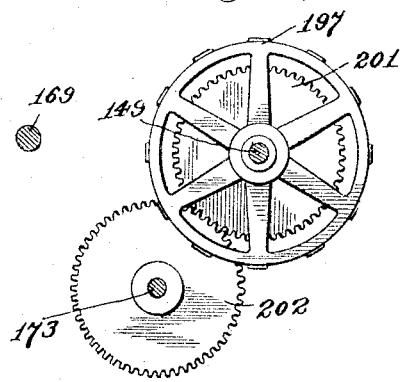
Figure 38:
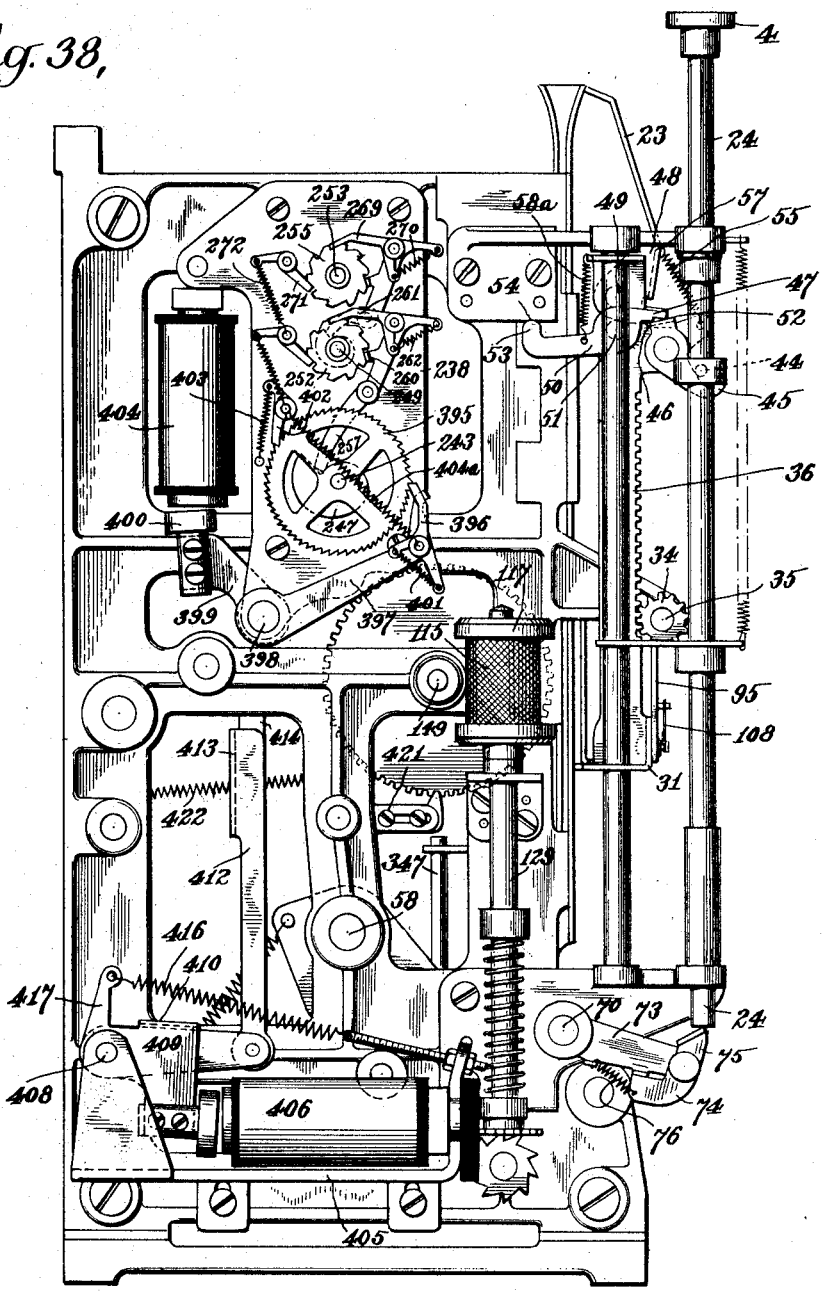

Figure 1 is a front elevation of the recorder. Fig. 2 is a side elevation with a portion of the case broken away to show the clock movement. Fig. 3 is a face view of the recorder mechanism. Fig. 4 is a side elevation of the recorder mechanism looking from the left. Fig. 5 is a central broken section taken on the line 5—5 of Fig. 3. Fig. 6 is a side elevation looking from the right. Fig. 7 is a front elevation with the card receiver and its mechanism removed. Fig. 8 is a vertical transverse section on the line 8—8 of Fig. 5. Fig. 9 is a horizontal section on the line 9—9 of Fig. 5. Fig. 10 is a detail section on line 10—10 of Fig. 12 showing the day of the week type wheel change. Fig. 11 is a detail section on line 11—11, Fig. 12, showing the hour type wheel change. Fig. 12 is a horizontal section on the line 12—12 of Fig. 5. Fig. 13 is a horizontal section of the type wheel shaft and its appurtenances, taken on the line 13—13 of Fig. 5. Fig. 14 is a detail of the date wheel setting levers. Fig. 15 is a horizontal section on the line 15—15 of Fig. 5. Fig. 16 is a detail view of the date change ratchet and pawl. Fig. 17 is a detail view of the month type wheel and its actuating gears. Fig. 18 is a central section of the card abutment and its accompanying parts taken on the line 5—5 of Fig. 3 and is similar in position to the right hand portion of Fig. 5. Fig. 19 is a view showing the same parts as Fig. 18 but with the parts in the "in" position. Fig. 20 is a detail view of the card abutment control and its cam, etc., in the "out" position. Fig. 21 is a detail face view of the punch cylinder control. Fig. 22 is an end view of punch cylinder control with the drive shaft in section. Fig. 23 is a horizontal section on line 23—23 of Fig. 21. Fig. 24 is a vertical transverse section on the line 24—24 of Fig. 21. Fig. 25 is a detail of the clutch member on the drive shaft of the punch cylinder control. Fig. 26 is a detail of the impositive lock of the cut out. Fig. 27 is a view showing a development of a portion of the minutes and tens of minutes pin cylinder. Fig. 28 is a rear view of the punches and punch plate. Fig. 29 is a side view of the minutes and tens of minutes punches looking from the right. Fig. 30 is a detail horizontal section of the minutes and tens of minutes pin cylinder and its punches. Fig. 31 is a detail of one of the parts shown in Fig. 30. Fig. 32 is a horizontal section on the line 32—32 of Fig. 1. Fig. 33 is a detail view showing the "time of day" type wheel lock. Fig. 34 is a front view of the parts shown in Fig. 33. Fig. 35 is a face view of a card that has been used in the machine in a first or "in" operation. Fig. 36 is a face view of the card shown in Fig. 35 which has been used in the machine in a second or "out" operation. Fig. 37 is a back view of the card shown in Fig. 36. Fig. 38 is a side elevation of the recording mechanism looking from the left and using an electric drive. Fig. 39 is a diagrammatic view showing the wiring for running a plurality of recorders electrically. Fig. 40 is a detail view of the "time of day" electrical driving mechanism. Fig. 41 is a front view of the parts shown in Fig. 40. Fig. 42 is a top view of the electro-magnets shown in Fig. 40. Fig. 43 is a perspective view of the shield which carries the ink ribbon.

Referring to the specific embodiment of my invention as shown in these drawings, 1 represents the case of the mechanism, 2 the ordinary clock movement and 3 the main operating handle. The recorder mechanism is provided with an "in" or first operation button 4, an "out" or second operation button 5, and a card slot 6 for the insertion of the recording card. In operating the machine the workman inserts a record card 7 such as is shown in Fig. 35 in the card slot 6, with the words "This side out" (as shown at 8, Fig. 37) toward him. He then depresses the "in" button and forces the card down into the machine where it is accurately registered with the printing and punching mechanism as will be hereinafter described. He then pulls the handle 3 and prints the "in" time on the record card at the point 9 (Fig. 35), the month and day of the month at 10 and the department number or letter at 11 and at the same time punches four holes in the four "in" columns 12, 13, 14 and 15 (Fig. 35). Column 12 represents units, 13 tens of units, 14 hundreds and 15 thousands. The punches do not punch hours and minutes but holes which represents a time of day for that machine.

When the piece of work has been completed the workman returns to the machine with the card 7 and inserts it in the card slot 6 and depresses the "out" key 5 and forces the card down into the machine where it is again accurately registered with the printing and punching mechanism. He then pulls the handle 3 and prints the "out" time on the record card at the point 16 (Fig. 36), the month and day of the month at 17 and the department number or letter at 18 and at the same time punches four holes in the four "out" columns 19, 20, 21 and 22 (Fig. 36). Column 19 represents units 20 tens of units, 21 hundreds and 22 thousands. The holes represent the then condition of the punches which corresponds to the time of day. The card has now punched in it holes which show by their location the digits composing the numbers which represent the starting and stopping time of a piece of work and the card can be used in an integrating machine to determine the extent or duration of this work and have it printed upon the card. At the same time the card has imprinted upon it the "in" or starting time and the "out" or finishing time.

*Card receiver and card abutment.*—For convenience the throat plate 6 is cut away on both sides as at 27 (Fig. 1) to enable the workman to insert and withdraw the card for printing. The carriage for moving the card (see Figs. 3, 4, 5, 6, 9, 12, 18, 19, and 20) consists of the side plates 28 and 29 held together by rod 30 and bottom plate 31. The carriage has outwardly extending ears 32—32 embracing the fixed rods 24—26. Gears 34—34 on the shaft 35 mounted loosely in side frames, engage with racks 36—36 cut in the front edge of side plates 28 and 29. The gears and racks serve the purpose of alining the two sides of the carriage when it is moved. A coil spring 37 with one end fastened to the frame at 38 and with its other end attached to collar 39 fast on shaft 35 serves to keep the carriage in its normal position and to return it to such position after it has been depressed. The carriage carries card abutment 25 (Figs. 3, 5, and 18). This abutment is mounted on rods 40 in bearings 41 of brackets 42 secured to plate 31 of the carriage. Rods 40 have a bearing 43 in plate 31.

Normally rods 40 remain with card-abutment 25 resting on upper portion of bracket 42. The carriage is moved downward and the fingers 23 (Fig. 18) thrown across the card-slot by the depression of either "in" button 4 or "out" button 5. Each of rods 24 and 26, for these buttons, carries a plate 4ª, which is connected with a fixed point of the frame by a spiral spring 5ª, which serves to maintain one button and its rod in an elevated position when the other is depressed to lower the carriage.

Each rod 24 and 26 has a pin 44 projecting from its side which engages in the downward movement of the parts with a hook lever 45 loosely pivoted on cross rod 30 of the carriage. It first swings hook lever 45 on rod 30 causing the upper end 46 of the lever to engage the lower arm 47 of bell crank lever 48 fast on a cross piece 49 running from one side of the plate 36 of the carriage to the other.

The parts are arranged so that when the fingers are moved they will pass through the card chute some distance above the upper part of the card, provided the card has been completely inserted in the card slot and rests upon the card abutment 25. Lever 48 and fingers 23 are held in this position by means of a latch piece 50 pivoted to the side of the frame of the carriage at 51 and having a latch portion 52 which engages with the upper surface 46 of lever 45. All these levers and fingers 23 are carried downward with the carriage along with the card-abutment and the card. On the return of rod 24 to its normal position the knob-end 53 of latch lever 50 strikes the end surface 54 of the framework just before the parts reach their uppermost position, rocking lever 50 and unlatching the part 52 from the surface 46. Spring 55 connecting the arm 56 of lever 45 with point 57 of lever 48, returns the two levers to their original position and withdraws fingers 23 from the card slot. Spring 58ª tends to keep lever 50 with its knob 53 against surface 54. After pin 44 has rocked hook-lever 45, the pin engages in the hook and pulls it downward, and with it the entire carriage, bringing the card abutment and card downward with it until the lower part of the card is opposite the printing wheels and the upper part opposite the punches. The card abutment and card are later moved slightly upon the carriage in order to bring the card into exact predetermined position with relation to the printing wheels and punches. While the button and its rod and the carriage are being depressed, they unlock the main operating shaft. The devices shown for this purpose are illustrated in Fig. 5. As the carriage is depressed its bottom plate 31 strikes a roller 59 loosely mounted on the end of arm 60 which is mounted on a stud 61 secured to the side frame of the machine. Fast with arm 60 is a pawl 62 normally in engagement with a tooth cut in plate 63 fast on main shaft 58.

A spring 64 normally holds pawl 62 in engagement with the tooth of plate 63. The further downward movement of the carriage rocks arm 60 withdrawing pawl 62 from engagement with its tooth and freeing the main operating shaft. The workman, while still keeping his hand on "in" button 4, and keeping it in depressed condition to prevent the carriage and connecting parts from returning to their normal position, now pulls the operating handle 3 which is mounted on the end of main driving shaft 58, so as to turn it in the direction of the arrow shown in Fig. 5. This actuates the registering devices and also causes the printing and punching to be done and toward the close of the operation releases certain of the parts so that they are free to return to their original positions. The arm 60 is kept in its depressed condition during this time by means of a downward projection 65 from the carriage which bears upon the roller 59. The card is brought into exact and accurate registry with the printing devices and punches by raising the card abutment 25 and the card slightly relatively to the rest of the carriage after the latter has been depressed.

When the carriage is depressed by the operator depressing one of the buttons, the bottom 66 of rod 40 rests upon a stop. Two stops are shown, one 67 for the "in" operation, and one 68 for the "out" operation. (See Fig. 5). These two stops are arranged at different heights to permit the carriage to be moved farther down in the "out" operation in order to bring the printing of the "out" time above the printing of the "in" time on the card, as shown in Fig. 36. As shown, these two stop surfaces are arranged upon an abutment 69 secured to the center of shaft 70. This shaft is arranged to rock slightly to bring one or the other of the stop surfaces underneath end 66 of rod 40. "Out" 68 is normally in this position. The stop 67 is thrown into this position whenever "in" button 7 is depressed. Fig. 19 shows this position of the parts while Figs. 5 and 18 show stop 68 in normal position. When the main operating handle is turned and the main shaft 58 rocked, the carriage is moved slightly downward. This is accomplished through pawl 71 for the "in" operation and pawl 72 for the "out" operation. One of these pawls hooks over a part 84 of the bottom plate 31 of the carriage and pulls it slightly downward as end 66 is upon one of the stops 67 or 68, it and its rods 40 and card abutment 25 and the card remain stationary while the rest of the carriage is moved downward. This brings the fingers 23 down just to the upper edge of the card, if the card has been properly inserted. If the card has not been fully inserted, these fingers press upon the upper edge and force the card down upon the card abutment 25, thus causing the card and the recording mechanism to occupy exactly the same positions with reference to each other every time the card is inserted into the machine and the machine operated. It causes exact and accurate register between the card and the recording mechanism. Fig. 19 illustrates this position of the parts on the "in" operation and Fig. 20 on the "out" operation.

The means for moving stop surface 67 into position are illustrated in Figs. 4, 5, 6, 18 and 20. Shaft 70 extends across the machine, carrying at its center abutment 69. On the left hand side, shaft 70, carries an arm 73 having mounted on it a pawl 74 the latter having an extension 75 at its upper end which coacts with the bottom of the "in" push rod 24. A spring 76 holds pawl 74 in proper position.

On the right hand side of the machine, shaft 70 has mounted thereon (see Figs. 4 and 20) an arm 77 having an extension or toe 78 which coacts with toe 79 on latch 80, the latter latch being pivoted to the framework at 81.

82 is a release pin mounted on latch 80 for releasing toe 78 from latch 79 toward the close of movement of the main operating rod 26. This is accomplished by pin 83 striking pin 82, as will be presently described.

When the carriage is depressed by one of the buttons, one or the other of the pawls 71 and 72, hooks over an extension 84 of the bottom plate 31 of the carriage, and the pawls are then pulled downward slightly by means connected with the driving shaft 58 of the machine, presently to be described. Normally, both pawls are in operative position, but in this case, the lower one, the "out" pawl 72, would do all the work. Accordingly, on the "in" operation this pawl 72 is thrown out of operative position, by means presently to be described, in order that "in" pawl 71 may be operative, the carriage is pulled down a less distance than when the "out" 72 is operated, the distance of this pull being, of course, the same as the distance between the printing of the "in" and "out" time at spaces 9 and 16 of card 7. The same means are used for pulling down each of these pawls. As shown, this consists of the following mechanism (see Figs. 5, 6 and 20): On the right hand side of the machine, and mounted on main shaft 58, is a plate 85 having a cam groove 86 coacting with a roller 87 mounted on lever 88, pivoted to the frame work at 89. Integral with arm 88 is arm 90, upon the outer end of which are pivoted, at 91, the two pawls 71, 72. Pawls 71 and 72 are normally held against a pin 83 on arm 90 by means of springs 93—93. Before the main operating handle 3 is pulled, the pawls and their operating mechanism are in the position shown in Fig. 6. After the "in" button has been depressed, and the handle 3 is pulled, the parts are in the position shown in Fig. 19 with pawl 71 locked over extension 84 of the bottom plate 31, and have pulled the carriage down a slight distance. After the operation of the "out" button and the handle 3 is pulled, these parts are in the position shown in Fig. 20 with the pawl 72 over the extension 84 of the carriage, pawl 72 having pulled the carriage down slightly farther than as shown in Fig. 19. In both of these instances, of course, end 66 and rods 40 have been forced upward forcing abutment 25 and the card slightly upward for registering purposes, as already described.

On the "in" operation, it is necessary to throw pawl 72 out of operative position, as already described. The devices shown in the drawings for this purpose are illustrated in Figs. 3, 4, 5 and 6. Mounted on the bottom plate 31 of the carriage is a piece 94, having an upwardly extending portion 95 adapted to coact with the underside of arm 96 fast in button rod 24. This piece 94 extends across the carriage and has an upward extension 97 which coacts with a rear extension 98 of the pawl 72. This extension 98 extends backward beyond pawl 71 and in the "in" operation, the lower part of extension 97 strikes rear extension 98 and forces pawl 72 backward so that when the carriage is fully depressed by the "in" button, pawl 72 will not engage the carriage. In that case, pawl 71 will engage with the carriage and pull it down a short distance, as already described. When sleeve 96 strikes extension 95 it forces it and piece 94 downward.

99 is an angular slot in piece 94 through which projects a pin 100 from bottom plate 31. Accordingly, the downward motion of piece 94 and the pin 100 force piece 94 to the left, as viewed in Fig. 3, bringing upper projection 97 into line with the rear portion 98 of "out" pawl 72. Piece 93 is latched into position by means of a pawl 101 locking into a notch 102 of projection 103 from piece 94. Pawl 101 is pivoted to the carriage at 104 and is held in normal latching position by spring 105. The parts are held in their latched position during the entire "in" operation, and remain so until released. This is accomplished by means of an arm 106, extending upwardly from pawl 101, and adapted, on the down movement of the "out" button 5 and rod 26, to engage with an arm 107 fast on rod 26. This releases the latch and permits the piece 94 and the parts connected with it to be returned to their normal position by means of spring 108 secured at one end to pin 100, and at the other end to portion 95.

Fig. 19 illustrates the operation in the "in" movement where extension 97 of the piece 94 has struck the rear extension 98 of "out" pawl 72 and removed that part from operative position, "in" pawl 71 now being operative to pull the carriage downward by locking over part 84 of the bottom plate of the carriage, and forcing the card abutment upward, as already described. Toward the end of the movement of the main operating shaft 58 pin 83 on arm 90 strikes pin 82 on latch 80, releasing (in the "in" operation) abutment 69 and shaft 70. Abutment 69 is returned to its normal position by means of spring 92. Just before this return to normal position takes place, the "in" printing and punching is effected through the main operating shaft 58.

*Clock drive and its connections to the "time of day" type wheels.*—The clock movement 2 placed in the upper portion of the casing 1 is connected to the recorder mechanism, in the usual manner, by means of the shaft 142. The lower end of this shaft is designed to be connected to the upper end of the inclined shaft 143, Fig. 4, which is mounted in bearings 144, 145, attached to the side frame 146 and is free to rotate in these bearings. Near the lower end of shaft 143 is mounted a gear 147, Fig. 4, which meshes with a gear 148 which is loosely mounted on rod 149 which is mounted in the side frames 146—150. The shaft 143 is revolved by the clock movement once every hour so that the gear 148 is revolved at the same rate. Mounted integrally with this gear 148 is a gear 151, alining wheel 152, cam 153 and minutes type wheel 154. These parts are held together by rivet pin 155, Fig. 13, and mounted on sleeve 156 and all revolve together once an hour.

Loosely mounted on rod 149 and adjacent to the minute wheel 154 is the hour type wheel 164. Hour type wheel 164 is secured to a sleeve 165 having mounted at its other end a wheel 166 having square notches in its periphery as shown in Fig. 11. Cam 153, which is integral with the minute type wheel 154, has bearing upon it an arm 167 which is loosely mounted on shaft 169. Arm 167 has an extension 168, Fig. 12, which connects it with an arm 170, which is secured to rock shaft 169. Wheel 166 having 24 square notches in its periphery has fitting into one of the notches the tooth 171 of a locking pawl 172 to prevent motion of the wheel in either direction except at predetermined intervals. Locking pawl 172 is loosely mounted on shaft 173 and has spring 174 for keeping the tooth 171 in engagement with notch in wheel 166. On the outer end of arm 170 is a pivoted dog 175 normally retracted by means of spring 176 and having an extension 177 forming a stop, by bearing against a bent portion 178 of arm 170, and having at its lower end a tooth 179 for engaging the notches of wheel 166. As the cam 153 rotates with the minute wheel 154 it gradually raises the arm 167 thereby raising arm 170 and its dog 175. As the latter raises, the inclined tooth 179 slides over the pin 180 on the upper end of locking pawl 172 and as the arm 167 is ready to drop off the high part of the cam 153 the tooth 179 is in such a position that it will pass behind the pin 180 when the arm 167 drops off the cam 153. As the tooth 179 moves downwardly the outer portion forces pin 180 to the right and causes the tooth 171 to be free from the notch of 166, at the same time the tooth 179 has picked up one of the notches and moved the wheel 166 and type wheel 164 forward the distance of one notch, or one twenty-fourth of a revolution.

The wheel 166 has twenty-four notches and the type wheel 164 has type on its periphery reading from 1 to 12 a. m. and from 1 to 12 p. m., the p. m. hours being distinguished by a short horizontal line under the digits representing the hours (see printing at 9, Fig. 35). In this way the hour type wheel is changed instantly and intermittently. Step by step motion is given to the day of the week type wheel 181 by a similar mechanism (see Fig. 10). Mounted on sleeves 165 together with hour type wheel 164 and wheel 166, is cam 181ª. Bearing on this cam is cam wiper 182 which is rigidly secured to arm 183 which is loosely mounted on shaft 169. The arm 183 has an extension 184 (Fig. 12) which gives this arm a double bearing on the shaft 169. Type wheel 181 has mounted with it wheel 185 having fourteen square notches in its periphery, as shown in Fig. 10. Wheel 185 has fitting into one of the notches the tooth 186 of a locking pawl 187 to prevent motion of the wheel 185 in either direction except at predetermined intervals. Locking pawl 187 is loosely mounted on shaft 173 and has spring 188 for keeping the tooth 186 in engagement with notch in wheel 185. On the outer end of arm 183 is a pivoted dog 189, normally acted upon by a spring 190, and having an extension 191 forming a stop by bearing against a bent portion 192, and having at its lower end an angular tooth 193 for engaging the notches of wheel 185. As the cam 181ª rotates with the hour wheel 164 it gradually raises the cam wiper 182, arm 183 and its dog 189. As the latter rises the inclined tooth 193 slides over the pin 194 on the upper end of locking pawl 187 and as the arm 183 is ready to drop off the high part of the cam 181ª the tooth is in the position shown in Fig. 10 and when the wiper 182 drops off the cam 181ª the outer portion will force pin 194 to the right and cause the tooth 186 to unlock from the notch in wheel 185. At the same time the tooth 193 has picked up one of the notches and moved the wheel 185 and type wheel 181 forward the distance of one notch, or one fourteenth of a revolution. The type wheel 181 has type on its periphery representing the days of the week in duplicate (see Fig. 12). Arm 183 has rigidly secured to it a finger piece 195 which extends through the frame 150 and the outer end of this piece has marked upon it " Day change ". This is to enable a man on opening the case to use arm 195 to perform the same function as the cam 181ª when the clock is started so as to bring the proper day of the week type on the printing line after the minutes and hour wheels have been set at the proper time by setting the clock movement hands. At the right hand end of rock shaft 169 is secured an arm 220 having an extension 221 bearing the designation " Hour change ". This arm is adjacent to arm 195 and enables an operator to perform the same function as the cam 153 and change the hour wheel so as to coincide with the hour hand of the clock.

From the foregoing description it will be seen that as the shaft 143 revolves once an hour by the clock movement 2, turns the minutes wheel 154 once an hour it successively presents to the printing line the characters from 0 to 59. The cam 153 mounted with type wheel 154 actuates mechanism which rotates hour wheel 164 step by step and successively presents to the printing line the characters 1 to 12 a. m. and 1 to 12 p. m. The cam 181ª mounted with type wheel 164 actuates mechanism which rotates the day of the week type wheel 181 step by step and successively presents to the printing surface the characters, printing the day of the week, viz: Sun, Mon, Tue, Wed, Thu, Fri, and Sat. The characters of the three type wheels 154, 164 and 181 print the day of the week, the hour and minute when a card is inserted in a manner shown at 9 and 16, Fig. 35. The printing of this left hand group of type wheels is performed by a printing pad 196 as will be presently described.

*Month type wheels, day of month type wheel and their accompanying mechanism.*—To the right of the group of type wheels 154, 164, 181, which are printed by pad 196 is situated a second group (see Fig. 12) composed of the month wheel 197, day of the month type wheel 198 and a fixed type slug 199 for printing a department letter or number. These print at the points 10—11, 17—18 (see Figs. 35—36) by pressure from printing pad 200. The type wheel 197 has upon its periphery type for printing the months of the year Jan.–Dec. Mounted with type wheel 197 is a gear 201, which meshes with a gear 202 which is secured to shaft 173. On the outer end of shaft 173 is an index wheel 203 which is marked with the months of the year (see Fig. 13). Adjacent to the side frame 150 is an impositive lock which consists of the notched wheel 204 and the spring held lock pawl 205. By turning the index wheel 203 type wheel 197 may be set manually so as to print on the record card any desired month. The type wheel 198 has mounted integrally with it a wheel 206 having thirty-one square notches in its periphery, as shown in Fig. 16.

The arm 167—170 of the hour change is secured to rock shaft 169 and is manually operated by arm 220 as heretofore described. Wheel 206 having thirty-one square notches in its periphery has fitting into one of the notches the tooth 207 of a locking pawl 208 to prevent motion of the wheel in either direction except at predetermined intervals. Locking pawl 208 is loosely mounted on shaft 173 and has spring 209 for keeping the tooth 207 in engagement with the notch in wheel 206. Loosely mounted on rock shaft 169 is an arm 210 having pivoted at its outer end a dog 211 normally retracted by a spring 212 and having an extension 213 forming a stop, by bearing against a bent portion 214 of arm 210, and having at its lower end an angular tooth 215 for engaging the notches of wheel 206. When the cam 181ª raises arm 183 and causes dog 189 to move notched wheel 185 forward step by step (as before described) it also raises arm 210 and its dog 211 which moves the wheel 206 forward one step in the same manner as pawl 189 moves notched wheel 185. The angular tooth 215 strikes pin 216 on the end of lock arm 208 in order to free tooth 207 from wheel 206. The finger pieces 195 and an extension of finger piece 218 are connected by a spring 219 so that when the "day change" arm is raised by its cam the "date change" is also operated. At the same time they may be operated manually either together or separately. The arm 210 has extending from it an arm which is labeled "date change". The "hour change" finger piece 221, "date change" finger piece 218 and the "day change" finger piece 195 are all in juxtaposition as shown in Figs. 12 and 14. The type slug 199 is mounted in an arm 217 which is rigidly secured to rod 149. This type slug 199 may be changed as often as desired and may print the machine number or any other information.

*Connection between clock drive and pin cylinders.*—Referring to Figs. 3, 4, 7, 8, 9, 13, 21, 22, 23, 24. Mounted on the sleeve 156 (see Fig. 13) together with the gear 148 and type wheel 154 is mounted a spur gear 151, which meshes with a spur gear 235 of the same size which is secured to shaft 236. Shaft 236, Figs. 4, 8, 23, has one end journaled in side frame 146 and has the other end journaled in side plate 237, of the frame which supports the intermittent driving mechanism, which turns the pin cylinders. Side plate 237 with side plate 238 form a frame which is secured to the side frame 146 by the studs 239—239 and are spaced apart from each other by thimbles 240 (Fig. 8). Inside of plate 237 and on the end of shaft 236 is a spur gear 241 which meshes with a gear 242 loosely mounted on the shaft 243 which is journaled in the side plates 237, 238. On the hub of gear 242 (Figs. 22 and 23) is one member of a clutch 244 which coacts with a second clutch member 245. Clutch member 245 is keyed to the shaft 243 and has a groove 246 made in its hub, into which fits the end of an arm for keeping the clutch either connected or disconnected as will be hereinafter described. On the outer end of shaft 243 is a cam 247 and on the other end is a slotted piece which forms one portion of a universal joint 248. Assuming that the clutch 244—245 is in engagement the shaft 243 makes one revolution every hour, being driven from shaft 143 by gears 147, 148, 151, 235, 241 and 242. The shaft 243 controls the rotation of the minutes and tens of minutes pin cylinder.

Journaled in side plates 237, 238, and above shaft 243 is a shaft 249 (Figs. 8, 21, 22) having at its inner end one member 250 of a universal joint and at its outer end a cam 251 and ten tooth ratchet wheel 252. This shaft controls the rotation of the hour pin cylinder. Above the shaft 249 is a similar shaft 253 having at its inner end one member 254 of a universal joint and at its outer end a ten tooth ratchet wheel 255. On the outer plate 238 is mounted a cam wiper 257 which is pivoted at 258 and coacts with cam 247. The cam wiper 257 has an upwardly extending arm 259 and has pivotally mounted at its upper end a pawl 261 (see Fig. 4) which engages ten tooth ratchet 252 on shaft 249. Pawl 261 is held in engagement with ratchet 252 by means of spring 262. The extension arm 259 has a bent portion 260 which coacts with ratchet 252 and acts as an overthrow stop. A click pawl 263 is provided and is held in engagement with ratchet 252 by spring 264. The cam 247, as before described, revolves once every hour and as it revolves draws the overthrow projection 260 out of engagement with ratchet and the pawl 261 backward, as the wiper drops off the high part of the cam the pawl 261 moves the ratchet 252 forward one tooth. The ratchet 252 on shaft 249 is moved forward one-tenth of a revolution at the end of each hour or one revolution every ten hours. Shaft 253 and its ratchet 255 is moved forward step by step by a similar mechanism, composed of cam 251 on shaft 249, wiper 265 pivoted at 266, upwardly extending arm 268, overthrow lock 267, pawl 269, spring 270. Also ratchet 255 has coacting with it a clock pawl 271 with spring 272. As shaft 249 with cam 251 and ball and socket joint member 250 revolve once every ten hours it follows that cam shaft 253 with ratchet 255 will be moved forward one tenth of a revolution every ten hours or shaft 253, ratchet 255, and ball and socket joint member 254 will revolve once every one hundred hours.

*Pin cylinders and their connections with the intermittent driving mechanism.*—Referring to Figs. 5, 6, 8, 9, 27 and 30. Extending between the side frames 146, 150 are two rods 273, 274, Figs. 5, 8. Slidably mounted thereon are two side plates 275, 276, which support the pin cylinders 277, 278 and 279. Pivoted on rock shaft 280 which is journaled in the side frames 146, 150 are two levers 281—281 which have supported between them at their lower ends cam roller 282 (see Fig. 8) which coacts with a cam slot 283, Fig. 5, cut in plate 234 which is secured to main shaft 58. The upper ends of these arms 281, 281 carry a pin 284 which has its outer end secured to two lever arms 285, 286 which are mounted on rock shaft 280 and which have their lower ends secured to arms 281, 281 by means of the pin 287. The upper ends of arms 285, 286 are pivoted to two links 288, 289 which have their other ends pivotedly secured to the side plates 275, 276 (see Fig. 9). From this it will be seen that when the cam 283 is actuated the side plates 275, 276 are moved forward carrying with them the pin cylinders which will cause certain punches to be operated as will be hereinafter described.

Journaled in the side plates 275, 276 is a shaft 290 which has secured to its left hand end one member of a universal joint 291, which is rotatively connected to shaft 243, journaled in side plates 237, 238, by means of a connecting rod 292. Connecting rod 292 has at either end a ball joint 293 which with its pin 294 forms the other members of the joints of which 248 on shaft 243 and 291 on shaft 290 are the other members. Secured to shaft 290 is a gear 295 which meshes with a gear 296 secured to the pin cylinder 277 (see Fig. 8). Hour pin cylinder 278 is similarly connected to shaft 249. Pin cylinder 278 has mounted upon its journal shaft socket 297 and shaft 249 has mounted upon it socket 250, and extending between the sockets 297, 250 is connecting rod 299 having at either end a ball and pin which with the sockets 250, 297 form universal joints. Shaft 249 revolves once every ten hours so pin cylinder 278 revolves every ten hours, being moved step by step by ratchet 252. Pin cylinder 279 is connected in a similar manner to shaft 253 by socket 254, rod 299 with balls and pins, and socket 300 mounted on the journal of pin cylinder 279. As shaft 253 rotates once every one hundred hours, so pin cylinder 279 revolves every hundred hours, being moved step by step by ratchet 255. From this it will be seen that the cam 283 can force forward the side plates 275, 276 with the pin cylinders 277, 278, 279 without disturbing the rotative connection of these parts with the shafts 243, 249, 253 supported in side plates 237, 238 which are fixed to the side frame 146.

The minute and tens of minute cylinder 277, Fig. 27, has set upon its surface six sets of pins 301 of ten pins each, each set being in a spiral which forms one sixth of a turn on the surface of the cylinder 277. Between each of the first seven rows of pins, circumferentially, are mounted six sectors 302, each one sixth of the circumference in length. These operate the tens of minutes punches and as there are six tens of minutes in each hour, six sectors 302 are all that are needed. If the mechanism was designed to punch hundredths of an hour ten sectors 302 would be needed. A development of this cylinder is shown in Fig. 27. Pin cylinder 278 (representing hours) has ten pins 303 which are set in a spiral forming one turn. Pin cylinder 279 (representing tens of hours) has ten pins 304 which are set in a spiral forming one turn. The side plates 276, 275 which support the pin cylinders are held in proper relation to one another by studs 304ª, 304ª riveted to them.

*Punches, mountings therefor, and card chute.*—Referring to Figs. 3, 5, 7, 9, 28, 30, 31 and 32. The case of the machine has at the upper portion of the part which contains the recording mechanism a cover plate 305, between which cover plate 305 and the side frame is supported the throat plate 6. The opening in the throat plate has near its center recessed portions 27, 27, which allows the operator to insert the card (see Fig. 32). This opening leads to the card chute which consists of a slotted guide piece 307, Fig. 7, with slot 308 and fastened to side frame at 309. The other side has a similar piece 310. Below these slotted pieces 307, 310 is the die plate and stripper through which the punches pass.

The die plate 311 is fastened to side frame 146 by screws 312, 312 and to side frame 150 by screws 313, 313. Mounted on this plate are spacing pieces 314, 315, Fig. 9, and on these the stripper plate 316, leaving an orifice 317 through which the card passes. Below the die plate 311 are two slotted guide pieces 318, 319 which guide the edge of the card. Guide piece 318 is composed of plate 320 fastened to side frame 146 at 321, spacing piece 322 and back guide piece 323. The other piece 319 is similarly constructed, and fastened to side frame 150. When a card is inserted in the machine it is held by the slots and orifice 317 and rests on abutment 25. When the "in" or "out" button is operated, as before described, and as the carriage descends the card slips freely down the slots.

There are four horizontal rows of punches (see Figs. 5 and 7), 324 the minutes punches and ten in number, 325 the tens of minutes punches and six in number, 326 the hour punches and ten in number, and 327 the tens of hours punches and ten in number. Each punch has a collet 328, which at its rear end bears against a supporting plate 329, which plate is attached to the stripping plate 316 by spacing pieces 330, 331 (see Fig. 9).

The minute and tens of minutes pin cylinder 277 carries both minute pins 301 and tens of minutes sectors 302. For this reason it is necessary to operate minute punches 324 and tens of minutes punches 325 from the center line of the cylinder 277. In Fig. 30, 332 is a supporting plate which is fastened to punch supporting plate 329 by two studs 333, 334 (see Fig. 28). This plate supports one end of a series of angularly disposed pieces 335 (see Fig. 31) the other end of which is supported in plate 329. Each piece 335 has an ear 336 for coacting with a punch. Ten of these pieces 335 are set on the center line of cylinder 277, coacting with the ten circumferential rows of pins 301, and with the ear 336 placed downward and coacting with the minute punches 324. Six of these pieces 335 are set on the center line of cylinder 277, coacting with the six tens of minutes sectors 302, and with the ears 336 placed uppermost and coacting with the six tens of minute punches 325. The ends of pieces 335 project through plate 332 and come into juxtaposition with its appropriate pin 301 or sector 302 of pin cylinder 277. Placed between rows of punches 324 and 325, and between rows 326, 327 are two retractors 337, 338. These extend across the sets of punches and engage the collets 328. Retractor 338 has at either side rearwardly extending arms 339, 340 which are pivotally attached to side plates 275, 276 at points 341, 342 (see Fig. 30). Retractor 337 has similar arms 343, 344 pivotally attached to side plates 275, 276 at points 345, 346 (see Figs. 29, 4, 6 and 8). When the mechanism is in normal position the retractors 337, 338 hold the punches in a rearward position so that none of them can project through the die plate. When the cam 283 forces forward the pin cylinders and side plates 275, 276 the retractors 337 and 338 are moved, freeing the punches and allowing the pin which is opposite a predetermined punch to press the punch through the card which has been inserted in the machine.

*Cut out device for controlling the punches.*—Referring to Figs. 4, 8, 9, 21, 22, 23, 24 and 26. The elapsed time which is printed on the record card by another machine is derived by a calculating mechanism which uses the "in" or first operation holes 12, 13, 14 and 15 for one factor and the "out" or second operation holes for the second factor. It is often desirable that the difference between these two records show only the time that the shop has been running. If a man rings in before the shop starts work the "in" operation would represent the time the shop starts. For this purpose a cut out device has been provided which stops the pin cylinders which control the punches.

As before described the punches are driven through gear 242 which meshes with gear 241 on shaft 236 which shaft is driven from the "time of day" type wheel mechanism. Gear 242 is mounted integrally with a clutch member 244, a second clutch member 245 having a groove 246 in its hub is splined to shaft 243 so that when the clutch is in, the pin cylinders revolve and when the clutch is out they are at rest.

Attached to the side plate 238 by screws 360 is a frame 361 which supports the clutch control mechanism (see Fig. 21). Coacting with groove 246 in the hub of clutch member 245 is a bell crank lever 361ª (Fig. 23) pivoted at 362 to frame 361. The other bell crank arm 363 carries at its outer end a roller 364 which coacts with a cam 365. Cam 365 has five high portions 366 and five low portions 367. When roller 364 is on one of the high portions 366 the clutch is out and the pin cylinders are at rest, conversely when roller 364 is on one of the low portions 367 the clutch is in. The clutch is pulled in by means of spring 368 which has one end attached to lever 361ª and the other to side plate 237. Cam 365 is secured to shaft 369 journaled in frame 361. At the other end of this shaft is mounted a ten tooth ratchet 370. Coacting with this ratchet is a pawl 371 pivotally mounted on arm 372 which is secured to rock shaft 373 journaled in a portion of frame 361. Pawl 371 is held in engagement by spring 374 which has one end secured to an extension 375 of arm 372. Arm 372 has a bent portion 376 which coacts with the ratchet 370 and serves as an overthrow stop. A click pawl 377 is pivoted to frame 361 and is held in engagement with ratchet 370 by spring 378.

A spring 379 having one end secured to stud of pawl 377 and the other secured to stud of pawl 371 on arm 372 serves to keep pawl 371 in its lower position. Mounted on rock shaft 373 is an arm 380 which is pivotally connected to a connecting link 381.

Referring particularly to Figs. 4, 8 and 32. Clock shaft 143 carries at a point just above the recorder mechanism a gear 382 which meshes with gear 383 mounted on shaft 384 journaled in a bracket 385 which is mounted on frame 386. Frame 386 is secured to the side of frames 146, 150. Near the center of frame 386 is rotatively mounted a program wheel 387 having gear teeth 388 cut in its periphery. Teeth 388 mesh with a pinion 389 secured to shaft 384. The shaft 143 revolves, as before described, once every hour and the pinion 389 and gear 388 are so proportioned that the program wheel 387 revolves once every twenty-four hours.

Program wheel 387 has near its outer edge a circumferential groove 389$^a$ which has adjacent to it graduations 390 divided into twenty-four hour divisions marked 1 to 12 for a. m. and 1 to 12 for p. m. and having each hour division subdivided into quarter hours. Mounted in the groove 389$^a$ are movable cam blocks 391. These may be of any number desired and may be set at any desired time. Each cam block 391 coacts with a toe 392, which is in its circumferential path. The toe 392 forms part of a lever 393 pivoted to the frame 386 at 394 and which has its outer end pivoted to connecting link 381. As before described link 381 has its lower end pivoted to arm 380. As cam block 391 passes under toe 392 it raises arm 393 and link 381 raises arm 380. This raises arm 372 and pawl 371. As the cam block 391 releases toe 392 arm 393 drops suddenly and pawl 371 being pulled down by spring 379 and the ratchet 370 is moved forward one tooth. This brings the roller 364 on to a high part 366 of cam 365 if previously on a low part and vice versa. From this it will be seen that by arranging the proper number of cam blocks set at the proper time the pin cylinders may be made to operate according to any desired program, leaving out in their forward rotation any desired length of time.

*Alining device.*—Referring to Figs. 3, 4, 13, 33 and 34. As the minute type wheel 154 is driven continuously by the clock movement, when a card is inserted and the handle 3 pulled to obtain a record, it is necessary to provide an alining device so that the minute wheel will print clearly one type and not portions of two types. Mounted with type wheel 154 is a sixty-tooth alining wheel 152 (as before described, see Fig. 33). Coacting with this wheel 152 is an alining rod 347 having its upper end 348 shaped like the spaces between the teeth and being guided in a sheet metal bracket 349 fastened to the side frame 146. The lower end of rod 347 has a cross pin 350 which is held in sockets 351 in arms 352 by spring 353.

Arms 352 form portions of a lever consisting of bent piece of metal 354 having the two arms 352 extending from it and pivotally mounted on a stud 355 which is mounted on side frame 146. One side of this bent piece 354 has a rearwardly extending arm 356 carrying a cam roller 357 which coacts with a cam 358 mounted on the main shaft 58. When the main shaft is turned by handle 3 the cam rocks piece 354 on its stud 355 and forces alining rod 347 with shaped end 348 upward and forces the toothed wheel either a little forward or back and so accurately alines type wheel 154 with the printing line. The spring 353 is provided so that if alining rod should strike the top of one of the teeth, the rod would stretch the spring 353 and the parts would not be distorted.

A spring 359 is attached to a projecting portion of cam 358 and has its other end fastened to the side frame 146. This spring serves to return main shaft 58 to its normal position when handle 3 has been pulled and then released.

*Ink ribbon.*—115 is the ink ribbon mounted and passing from one spool 116 to the other spool 117. Any suitable means for moving the ink ribbon and reversing it, either manual or automatic, may be employed. The means shown for this purpose are illustrated in Figs. 3, 4, 5, 6, 7 and 13. These means are as follows: 118 is a pawl pivoted at 119 on the lower part of arm 88, and having a spring 120 normally holding a finger 121 secured to pawl 118 against ratchet wheel 122. Ratchet 122 is mounted on shaft 123 running across the machine, and having a pinion 124 on one end adapted to engage a pinion 125 on shaft 126 carrying spool 116. Shaft 123 has on its other end a pinion 127 adapted to engage a pinion 128 on shaft 129 carrying spool 117. Shaft 123 and its pinions are so arranged that the shaft can be shifted horizontally so that one of the pinions, and one only, will engage, at a time, with its corresponding pinion, thus moving the ink ribbon one way. When the shaft is moved in the other direction, the other pinion will engage the pinion and the shaft of the other spool and move the ink ribbon the reverse way, ratchet 122 and its shaft being rotated on each operation of the machine through pawl 118 and its finger 121. 130 is a stop pawl to prevent backward rotation of ratchet 122. Shaft 123 and its pinions are shifted horizontally by means of a lever 131 on lever 137. The levers 131, 137 have downwardly extending portions 138 and 139 which are connected together by rod 132. Extension 139 has a portion 136 engaging the abutment surfaces 135 and 133. If the ribbon is moving to the right the parts are in the position shown in Fig. 3 and gears 124 and 125 are in engagement. When the usual loop or shift button on the ribbon comes against the bifurcated part 134 of arm 131 and rocks it and rod 132 is moved and causes the portion 136 to move the gears 124, 125, out of mesh and gears 127, 128 into mesh. The upper portion of arm 137 is also provided with a bifurcated end 134 similar to that on arm 131. The lever 137 is provided with a loose roll 140. This roll coacts with an impositive lock 141 mounted on the frame of the machine. This is provided to give a quick movement in meshing and unmeshing the gears and is usual in this type of ribbon shift and therefore needs no further description.

In passing across the machine from spool 116 to spool 117 the ink ribbon 115 is held in proper position in relation to the type wheels by means of guide plate 109, which is supported on side frame 146 at 111 and on side frame 150 at 110. A recess 112 is formed in guide plate 109 so that ribbon 115 may pass behind abutment 25 and its supports (see Fig. 43). In this recess is mounted a flat plate 113 having two toes fitting in holes in plate 109 and held at the top by button 157. This plate 113 serves to guide the ribbon against the back of the recess 112. Two shields 158 and 159 serve to cover the two groups of type wheels except at the printing point. These shields 158 and 159 are riveted to guide plate 109 (see Fig. 7). After leaving spool 116 the ribbon passes through a slot 160 in the right hand edge of plate 109 and then through slot 161 into recess 112 (see Fig. 43), then behind plate 113 in the rear of recess 112 and then through slot 162 in the right hand edge of recess 112, then through slot 163 to the spool 117.

*Printing pads.*—Referring to Figs. 3, 5, 12 and 15. Each group of printing wheels is printed by a separate pad. Type wheels 154, 164 and 181 at the left are printed by pad 196 and the type wheels 197, 198 and type slug 199 at the right are printed by pad 200 (see Fig. 12). Pad 196 is mounted in the head 222 of arm 223 and has an adjusting screw 224 for giving the proper positions to the printing pad. Pad arm 223 is mounted on shaft 225 which is supported in bearings in side frames 146—150.

Pad 200 is mounted in the head 226 of arm 227 and has an adjusting screw 228 for giving the proper position to the printing pad 200. Between the two arms 223 and 227 are mounted two cam roller arms 229, 229 also supported by shaft 225. These arms 229, 229 have forwardly extending portions 230 which carry a pin 231 which has its ends supported in the arms 223, 227 (see Fig. 3).

The arms 229, 229 have supported between them at their rearward ends a cam roller 232 which coacts with a cam 233 formed on the outer periphery of a plate 234 which is secured to the main shaft 58. The contour of this cam is such that at the proper time, when the handle 3 is pulled, the cam 233 acting on roller 232 forces both printing pads 196 and 200 against the card and causes the then condition of the two groups of type wheels to be imprinted on the record card, the ink ribbon being between the type wheels and the card.

*Electric drive.*—It may be desirable at times to drive a number of recorders in synchronism from a master clock. Referring to Figs. 38, 39, 40, 41 and 42. In these drawings I have shown the mechanism and circuits by which I accomplish this result. The pin cylinders and their control mechanism are mounted as in the clock driven form previously described. The train of gearing from the clock to the shaft 243 and the gear 242 on shaft 243 are omitted. On the end of shaft 243 and adjacent to cam 247 is secured a sixty tooth ratchet wheel 395. Coacting with this is a pawl 396 pivotally mounted on the end of lever 397 which is secured to rock shaft 398 journaled in side plates 237, 238.

Mounted on rock shaft 398 is an arm 399 which carries armature bar 400. Pawl 396 is held in engagement with ratchet 395 by spring 401. A click pawl 402 held in by spring 403 is provided. Electromagnet 404 is supported by side plates 237, 238 in such a position as to coact with armature bar 400. When magnet 404 is energized, the pawl 396 on arm 397 is retracted. When the magnet 404 is deënergized the spring 404$^a$ operates to force pawl 396 upward moving the ratchet wheel 395 forward one tooth. If the magnet 404 is energized once every minute the ratchet wheel 395 will be fed forward step by step one revolution each hour and so moving forward the pin cylinders. If the magnet 404 is not energized periodically the pin cylinders will remain at rest. The time of day type wheels mounted on rod 149 are driven as follows: Supported on side frame 146 is a frame 405, Fig. 40, which has supported on it an electro-magnet 406. The rear portion of the frame 405 is bent up to form two bearings 407—407. Journaled in the bearings 407—407 is a rock shaft 408 having mounted upon it a lever 409 which carries an armature bar 410 which coacts with the magnet 406.

Lever 408 has an extension 410 which is integrally formed with an arm 411 also mounted on rock shaft 408. Pivotally attached to lever 411 is a connecting link 412 having a bent portion 413 extending through an opening in frame 146 and at the inside end of portion 413 an upwardly extending arm 414 which is pivotally connected to an arm 415 mounted loosely on rock shaft 169 extending between the side frames. A spring 416 attached at one end to an extension 417 of lever 409 has its other end adjustably connected to the frame 405 (see Fig. 38) and serves to keep the armature bar 410 in a retracted position.

Mounted with the minute type wheel 154 is a sixty-tooth wheel 418 having square teeth. Coacting with wheel 418 is a pawl 418ª which is mounted on arm 415 and held in engagement with wheel 418 by means of spring 419. Arm 415 has an extension 420 terminating in a tooth which fits the notches of wheel 418 and normally is in engagement with one of them.

A clock pawl 421 is pivotally mounted on rod 173 and is held in engagement with the teeth of wheel 418 by means of spring 422 which has its rear end attached to rod 280. The clock pawl 421 has just below it and coacting with it rod 347 mounted as before described but having its upper end squared off. Rod 347 is guided in bracket 349 and its lower end being mounted in sockets 350 in arms 352. Cam 358 on main shaft serves to operate rod 347 when handle 3 is pulled. When handle 3 is pulled the wheel 418 and type wheel 154 are locked during the recording operation. If during the recording operation the electro-magnet is energized the pawl 418ª is pulled up into the next tooth and it stays there until the handle is released when the spring 416 retracts the armature 410 and feeds the wheel 418 forward one tooth.

I will now proceed to describe the circuits for energizing the magnets 406 and 404 at the proper time. Referring to Fig. 39 423 represents a shaft of a clock movement which revolves once every minute and carries an insulated toothed disk 424. 425 is a contact arm pivoted to insulated block 426 and normally pulled downward by spring 427 and carrying a downward contact pin 428. 429 is a contact arm pivoted to the insulated block 426 and mounted on the same center as contact arm 425 but insulated therefrom. Contact arm 429 is normally pulled downward by spring 430 and it has an upwardly extending contact point 431 for coacting with contact point 428. The ends of the arms 425, 429, rest against the disk 424 and as it rotates the tooth raises the arms. In this position the contacts 428, 431 are separated. The tooth of disk 424 passes the extreme end of 425, the latter slipping downward off the tooth and making contact between 428 and 431. An instant later 429 drops off the tooth again separating 428 and 431. A momentary contact is thus made every minute. When the finger of disk 424 brings contacts 428 and 431 together, it closes a circuit through wire 432, magnet 433, wire 434, battery 435, wire 436, magnet 437 and wire 438 back to contacts 428 and 431. In this way, magnets 433 and 437 are energized momentarily every minute. Magnet 433 is the electromagnet of a relay composed of armature bar 439, retracting spring 440 and contact 441. Contact 441 and armature 439 form part of a main circuit composed of wire 442 which extend the region in which it is desired to place recorders. Wire 442 and return wire 443 which passes through battery 444 and thence to armature 439, form the main circuit for driving the time of day train of type wheels. 406, 406′, 406″ represent the type wheel driving magnets of three recorders which embody my invention. These are tapped into the main circuit by two wires. 406 with wires 445, 446, 406′ with wires 445′, 446′ and 406″ with wires 445″, 446″. From this it will be seen that every time the relay magnet 433 is energized the battery 444 energizes the magnets 406, 406′, 406″ and the armatures 410, 410′, 410″ being attracted the type wheel train of each recorder is fed forward one unit. Any number of recorders may be placed in such a circuit and will run in synchronism.

Magnet 437 forms part of a ratchet feed mechanism for controlling the circuit which actuates the pin cylinder feed of each recorder. Magnet 437 coacts with armature 447 pivoted at 448 and having extending arm 449 carrying spring held pawl 450 and having spring 451 for normally holding arm 449 in a downward position. Pawl engages a sixty-tooth ratchet wheel 452 and which is fed forward one tooth each time that magnet 437 is energized. Mounted with ratchet wheel 452 is a pinion 453 which meshes with gear teeth 454 cut in the periphery of program wheel 455. Pinion 453 revolves once every hour and with gear teeth 454 is so proportioned that program wheel 455 will revolve once every twenty-four hours.

Program wheel 455 has near its outer edge a circumferential groove 456 which has adjacent to it graduations 457 divided into twenty-four hour divisions marked 1 to 12 for a. m. and 1 to 12 for p. m. and having each hour division subdivided into quarter hours. Mounted in the groove 456 are movable cam blocks 458. These may be of any number desired and may be set at any desired point of the graduations. Each cam block coacts with a circuit making device similar to the one described as being operated by insulated disk 424 on minute shaft 423 in the clock.

459 is a contact arm pivoted to insulated block 460 and held downward by spring 461 and having contact point 462. 463 is the other pivoted contact arm carrying contact 464 and pulled downward by spring 465.

The ends of the arms 459 and 463 rest in such a position that their ends are in the path of the cam blocks 458. As the program wheel 455 rotates a cam block 458 raises the arms 459, 463. In this position the contacts 462, 464 are separated. The cam block 458 passes the extreme end of 459, the latter slipping downward off the cam block and making contact between 462 and 464. An instant later arm 463 drops off the cam block again separating 462 and 464. A momentary contact is thus made by each cam block 458 at a predetermined time.

The contacts 462, 464 serve to control a cut out relay which will now be described. When contact is made between 462 and 464, a circuit is established consisting of wire 467, battery 435, tap 468, wire 469, magnet 470 and wire 471. From this it will be seen that each time a contact block 458 closes momentarily contact 462, 464 magnet 470 is energized.

472 is an armature pivoted at 473 which coacts with magnet 470. Armature 472 has a retractive spring 474 and at the end of an arm has pivotally mounted a pawl 475 which coacts with a ratchet wheel 476 pivoted at 477. Pawl 475 is held in engagement with ratchet 476 by spring 480. Stop pin 478 is provided and the shape of the pawl 475 is such that it engages pin 478 and this forces it to stop at an exact point. A click pawl 479 held in engagement by spring 480 is provided.

Mounted integral with ratchet 476 on center 477 is a toothed cam wheel 487 which has half as many teeth as ratchet 476. Mounted in engagement with this is a lever 481 pivoted at 482 having toe 483 engaging cam wheel 487 and having at its outer end a contact 484. This lever is insulated from the supporting frame 488. Contact 484 coacts with a contact 485 supported by the frame 488 and insulated therefrom. When the toe 483 is on the top of one of the teeth of toothed cam wheel 487 the contacts 484, 485 are separated. When the toe 483 is in one of the notches of cam wheel 487 the contacts are closed.

The program wheel 455 and its mechanism and the cut out magnet just described may be placed in the clock or at any desired point.

Contacts 484, 485 control a circuit for feeding the pin cylinders of a series of recorders. This circuit is composed of contact 484, arm 481, wire 485, common return wire 443, armature 439, contact 441 and wire 442. It will be noted that armature 439, battery 444 and wire 443 are common to both this circuit and the one already described as feeding the time of day type wheels of a series of recorders.

404, 404', and 404'' represent the pin cylinder driving magnets of the three recorders shown in the diagram as before described. These are tapped into the circuit just described, which has main wires 443, 485, by two wires, 404 with wires 487, 488, 404' with wires 487', 488' and 404'' with wires 487'', 488''.

From the foregoing description it will be seen that if contacts 484, 485 are closed that each time magnet 433 is energized magnets 404, 404' and 404'' will be energized, attracting armatures 400, 400', 400'' and the pin cylinders of the series of recorders are fed forward one step. If contacts 484, 485 are open the pin cylinders remain at rest. The position of the contacts 484, 485 are determined by the toe 483 resting on the top of a tooth of cam wheel 487 or in a space. Arm 481 carrying toe 483 is pulled down into contact with cam wheel 487 by means of spring 486. Magnet 470 which feeds forward the cam wheel 487 is controlled by contacts 462, 464 which are actuated by the cam blocks 458 on program wheel 455.

By arranging the cam blocks 358 on the program wheel 455 at proper places and a proper number of them the contacts 484, 485 can be closed and opened at any predetermined time.

It will be seen that with this arrangement of program wheel and cut out relay the pin cylinders of a series of recorders may be stopped or started at any predetermined time and thus control the extent of time records punched in a record chart.

Except in such particulars as may be specifically noted herein the construction of the mechanism so long as it is adapted to perform its allotted functions above set forth is very largely immaterial.

What I claim is:—

1. In a time recording mechanism, the combination with a driving clock train, of disks representing by type thereon different time units, of means for impressing on a suitable surface from such type the time of an operation of the machine, cylinders movable in a plane at right angles to their axes, and having radially projecting pins set therein, time indicating punches adapted to be operated by the engagement therewith of the pins, and connections between the pin cylinders and the driving clock train whereby at the hours and fraction of an hour the said cylinders will be rotated to bring the appropriate pins to operative position.

2. In a time recording mechanism, the combination with a driving clock train, of disks representing by type thereon different time units and means for impressing on a suitable surface from such type the time of an operation of the machine, of cylinders movable in a plane at right angles to their axes, having radially extending pins set therein, time indicating punches in the path of said pins and extra wheel connections between the said cylinders and the clock train, whereby at hours and fractions of one hour the pin cylinders will be rotated to bring the appropriate pins to their operative position without interfering with the lateral movement of the cylinders.

3. In a time recording machanism, the combination with a series of punches of a clock train and groups of rotary punch selectors movable bodily with respect to the normal position of said punches, extensible driving shafts between the clock train and the punch selectors whereby the latter are continuously moved to present those selectors appropriate to a given time to operative position, and means for bringing the punches and selectors into operative relation.

4. In a time recording mechanism, the combination with a driving clock train, time card printing wheels, operated thereby, punch selecting devices also operated by the driving clock train, of a series of punches, means for positively forcing the same forward and back through a card to be perforated, and means for locking the punching and the printing mechanism except while the cards to be marked are in the proper operative position for that purpose.

In testimony whereof I affix my signature in the presence of two subscribing witnesses.

JAMES W. BRYCE.

Witnesses:
Thomas J. Byrne,
Hugo B. Polson.

Copies of this patent may be obtained for five cents each, by addressing the "Commissioner of Patents, Washington, D. C."